United States Patent
Holcombe et al.

(10) Patent No.: US 8,041,227 B2
(45) Date of Patent: Oct. 18, 2011

(54) APPARATUS AND METHOD FOR NEAR-FIELD COMMUNICATION

(75) Inventors: Wayne T. Holcombe, Mountain View, CA (US); Pavel Konecny, Sunnyvale, CA (US); Miroslav Svajda, Sunnyvale, CA (US); Jean-Luc Nauleau, Los Gatos, CA (US); Robert Gordon Farmer, Modesto, CA (US)

(73) Assignee: Silicon Laboratories Inc., Austin, TX (US)

( * ) Notice: Subject to any disclaimer, the term of this patent is extended or adjusted under 35 U.S.C. 154(b) by 935 days.

(21) Appl. No.: 11/940,775

(22) Filed: Nov. 15, 2007

(65) Prior Publication Data

US 2010/0021176 A1    Jan. 28, 2010

Related U.S. Application Data

(60) Provisional application No. 60/859,378, filed on Nov. 16, 2006.

(51) Int. Cl.
*H04B 10/00* (2006.01)

(52) U.S. Cl. ........ 398/138; 398/135; 398/130; 398/128; 398/115

(58) Field of Classification Search ............... 398/135, 398/138, 128, 130, 118, 115, 116, 117, 164, 398/139
See application file for complete search history.

(56) References Cited

U.S. PATENT DOCUMENTS

| | | | |
|---|---|---|---|
| 3,265,972 A | 8/1966 | Curry | 455/40 |
| 4,061,972 A | 12/1977 | Burgess | 455/41.1 |
| 4,292,595 A | 9/1981 | Smith | 330/10 |
| 4,763,340 A | 8/1988 | Yoneda et al. | 375/377 |
| 4,918,737 A | 4/1990 | Luethi | 381/315 |
| 5,437,057 A | 7/1995 | Richley et al. | 455/41.1 |
| 5,621,592 A | 4/1997 | Gill et al. | 360/319 |
| 5,621,913 A | 4/1997 | Tuttle et al. | |
| 5,864,591 A | 1/1999 | Holcombe | 375/345 |
| 6,141,592 A | 10/2000 | Pauly | 607/60 |
| 6,240,283 B1 | 5/2001 | Holcombe | 455/245.1 |
| 6,336,031 B1 | 1/2002 | Schyndel | 455/41.2 |
| 6,612,852 B1 | 9/2003 | Panella | 439/70 |
| 6,751,691 B1 | 6/2004 | Douglas | 710/73 |
| 6,782,208 B1 * | 8/2004 | Lundholm et al. | 398/135 |
| 6,879,996 B1 * | 4/2005 | Laves | 709/206 |
| 7,292,637 B2 * | 11/2007 | Ho et al. | 375/257 |
| 7,305,038 B2 * | 12/2007 | Grillo et al. | 375/257 |
| 2002/0093455 A1 * | 7/2002 | Einat | 343/702 |
| 2003/0165208 A1 * | 9/2003 | Carter et al. | 375/373 |
| 2004/0208591 A1 * | 10/2004 | Willebrand et al. | 398/115 |

OTHER PUBLICATIONS

Aura, "LibertyLink LA116", 2005, 1 pg.
The Register, "CE Firms Drawn to Magnets for Wireless MP3 Players", 2004, 3 pgs.
Smith, "Germans to Get Pay-By-Phone Public Transport", Reghardware, 2006, 2 pgs.

(Continued)

*Primary Examiner* — M. R. Sedighian
(74) *Attorney, Agent, or Firm* — O'Keefe, Egan, Peterman & Enders LLP

(57) ABSTRACT

A communication device is disclosed having optical and near-field communication capability. The device includes an optical transceiver circuit fabricated on an integrated circuit die and configured to transmit and receive far field signals. A near field transceiver circuit is also fabricated on the integrated circuit die and is configured to transmit and receive near-field electro-magnetic signals. Control circuitry is provided to selectively enable the optical transceiver circuit and the near field transceiver circuit responsive to an external control signal.

37 Claims, 13 Drawing Sheets

OTHER PUBLICATIONS

Fazzi, A. et al., "A 0.14mW/GBps High—Density Capacitive Interface for 3D System Integration", Proceedings of CICC 2005 Conference, San Jose, pp. 101-104.

Drost, R. et al., "Proximity Communication," IEEE J. Solid-State Circuits, vol. 39, Issue 9, pp. 1529-1535, Sep. 2004.

Zimmerman, "Personal Area Networks: Near-field Intrabody Communicaiton," IBM Systems Journal, vol. 35, Nos. 3 & 4, 1996, pp. 609-617.

Sony, "FeliCa: Contactless IC Card Technology," FGE007-01-0803, Mar. 2008.

FreeLinc, "FreeMotion 200," pp. 1-2, 2010.

Nokia Europe, "Near Field Communication (NFC)," http://europe.nokia.com/A4307097.

Leklider, "The World of the Near Field," http://archive.evaluationengineering.com/archive/articles/1005/1005the_world.asp.

* cited by examiner

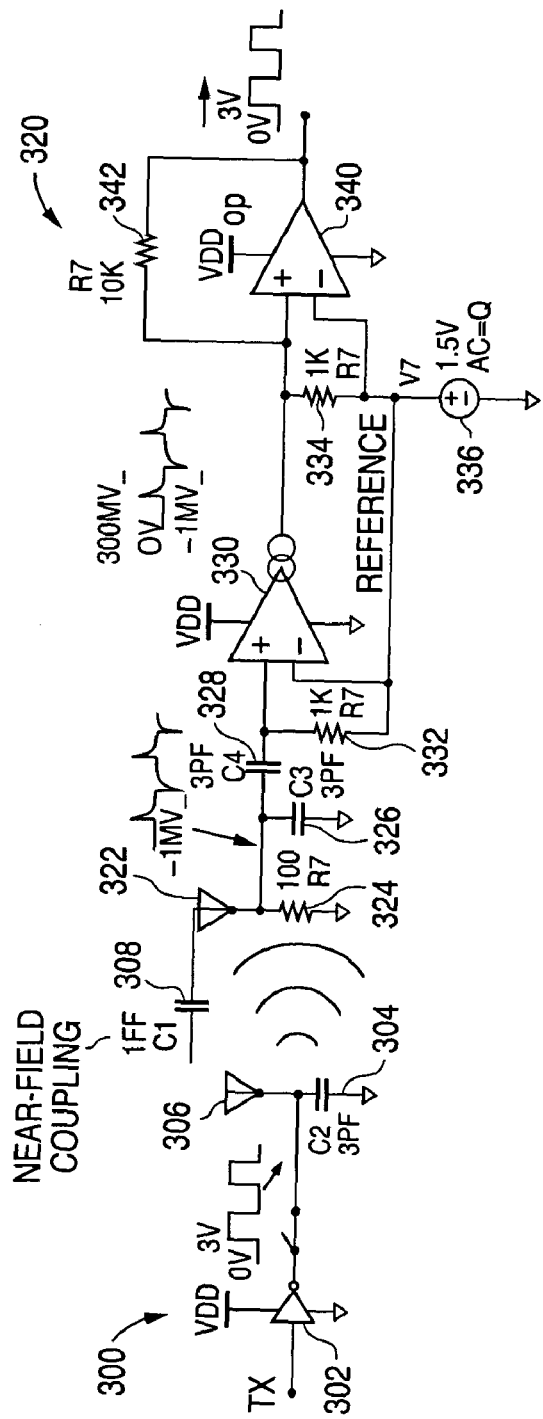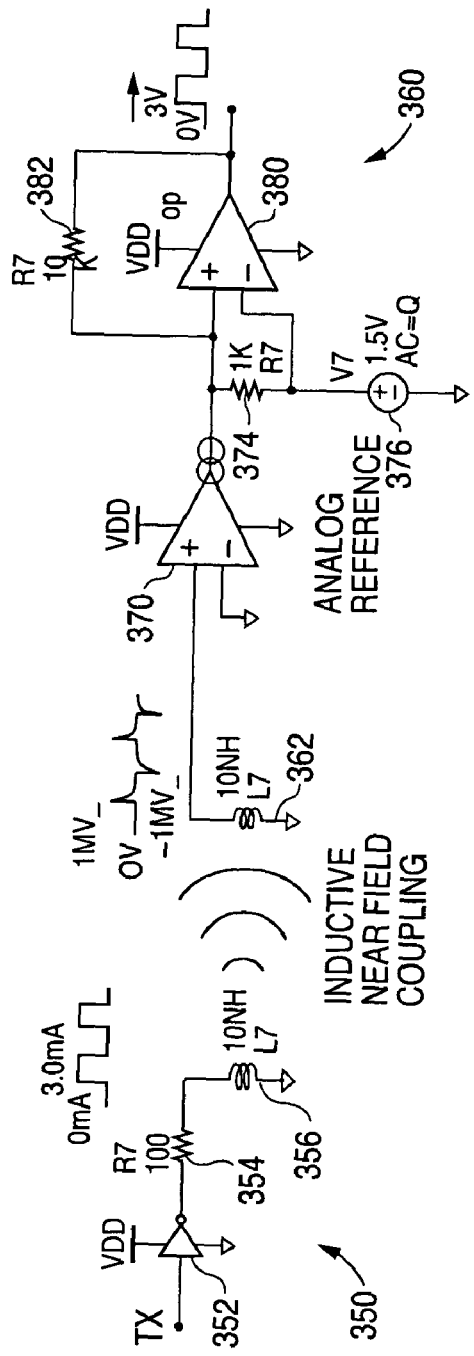
FIG. 4
FIG. 5

APPARATUS AND METHOD FOR NEAR-FIELD COMMUNICATION

CROSS-REFERENCE TO RELATED PATENT APPLICATIONS

This patent application claims the benefit of U.S. Provisional Patent Application No. 60/859,378 filed Nov. 16, 2006 and hereby incorporates this application by reference in its entirety.

FIELD OF THE INVENTION

This invention pertains to data communication and, more particularly, short range communication.

BACKGROUND OF THE INVENTION

Infrared data communication is a known technique for short range data communications. The Infrared Data Association (IrDA) defines protocols for one example of an infrared communications scheme. An IrDA infrared communication transceiver typically provides 115.2 Kbp to 16 Mbs wireless transfer of data transfer over less than one meter. It uses a "point and beam" paradigm to transfer variable length data files; such as, speed directory lists on cell phones or PDA, MP3 files, pictures, or video clips. Although it is a wireless or cable replacement technology, IrDA is not suitable for networking like RF (Radio Frequency) IEEE 802.11 Wi-Fi or Bluetooth radio frequency protocols since it does not have sufficient range and only works within the +/−15 degree "point and beam" cone.

The following references provide additional background for the present invention. U.S. Pat. No. 4,763,340 for capacitive coupling type data transmission circuit for portable electronic apparatus. U.S. Pat. No. 3,265,972 for underwater electrical field communication system. U.S. Pat. No. 4,292,595 for capacitance coupled isolation amplifier and method. U.S. Pat. No. 6,141,592 for data transmission using a varying electric field. U.S. Pat. No. 6,336,031 for wireless data transmission over quasi-static electric potential fields. U.S. Pat. No. 5,621,913 system with chip to chip communication. U.S. Pat. No. 6,751,691 arrangement for data transfer between a computer and peripheral device or other data processing device. U.S. Pat. No. 6,612,852 for contactless interconnection system. U.S. Pat. No. 4,918,737 for hearing aid with wireless remote control. U.S. Pat. No. 5,437,057 for Wireless communications using near-field coupling. U.S. Pat. No. 4,061,972 for Short range induction field communication system. U.S. Pat. Nos. 5,864,591 and 6,240,283 for Feedback mitigation. Fazzi, A. et al; "A 0.14 mW/Gbps High-Density Capacitive Interface for 3D System Integration," Proceedings of CICC 2005 Conference, San Jose, pp. 101-104. Drost, R. et al. "Proximity communication," IEEE J. Solid-State Circuits, Volume 39, Issue 9, pp. 1529-1535, September 2004.

The following websites provide additional information regarding communications systems:

http://www.reghardware.co.uk/2006/04/19/nokia_cashless_bus_tickets/
http://www.nokia.com/nfc
http://www.theregister.co.uk/2004/07/22/aura_wireless/
http://www.auracomm.com/site/content/llla116.asp
http://www.sony.net/Products/felica/abt/dvs.html
http://www.research.ibm.com/journal/sj/353/sectione/zimmerman.html
http://www.evaluationengineering.com/archive/articles/1005/1005the_world.asp
http://www.eetasia.com/ART_8800412880_590626_a6f100b7200604.HTM

BRIEF SUMMARY OF THE INVENTION

In one embodiment, a communication device is provided having optical and near-field communication capability. The device includes an optical transceiver circuit fabricated on an integrated circuit die and configured to transmit and receive optical signals. A near field transceiver circuit is also fabricated on the integrated circuit die and is configured to transmit and receive near-field electro-magnetic signals. Control circuitry is provided to selectively enable the optical transceiver circuit and the near field transceiver circuit responsive to an external control signal.

In an embodiment of a method for providing near field communication capability in an optical transceiver device, the method calls for fabricating an optical transceiver circuit and a near field transceiver circuit on an integrated circuit die, where the optical transceiver circuit is configured to transmit and receive optical signals, and further wherein the near field transceiver circuit is configured to transmit and receive near-field electro-magnetic signals. The method also calls for providing control circuitry for selectively enabling the optical transceiver circuit and the near field transceiver circuit responsive to a control signal.

In an embodiment of a system for near field communication, the system includes a first integrated circuit device that includes a first transceiver circuit, a near field transceiver circuit, and control circuitry that selects one of the first transceiver circuit and the near field transceiver circuit for operation responsive to an external control signal. The system also includes a second integrated circuit device that includes a near field transceiver circuit. The near field transceiver of the first device and the near field transceiver of the second device are capacitively coupled to one another in order to exchange near field data signals.

BRIEF DESCRIPTION OF THE DRAWINGS

Certain exemplary embodiments are described below with respect to the following figures, wherein:

FIG. 4 is a circuit diagram illustrating an example of a transmitter and receiver pair showing capacitive near-field coupling;

FIG. 5 is a circuit diagram illustrating an example of a transmitter and receiver pair illustrating inductive near-field coupling;

DETAILED DESCRIPTION OF THE INVENTION

Figure 1:
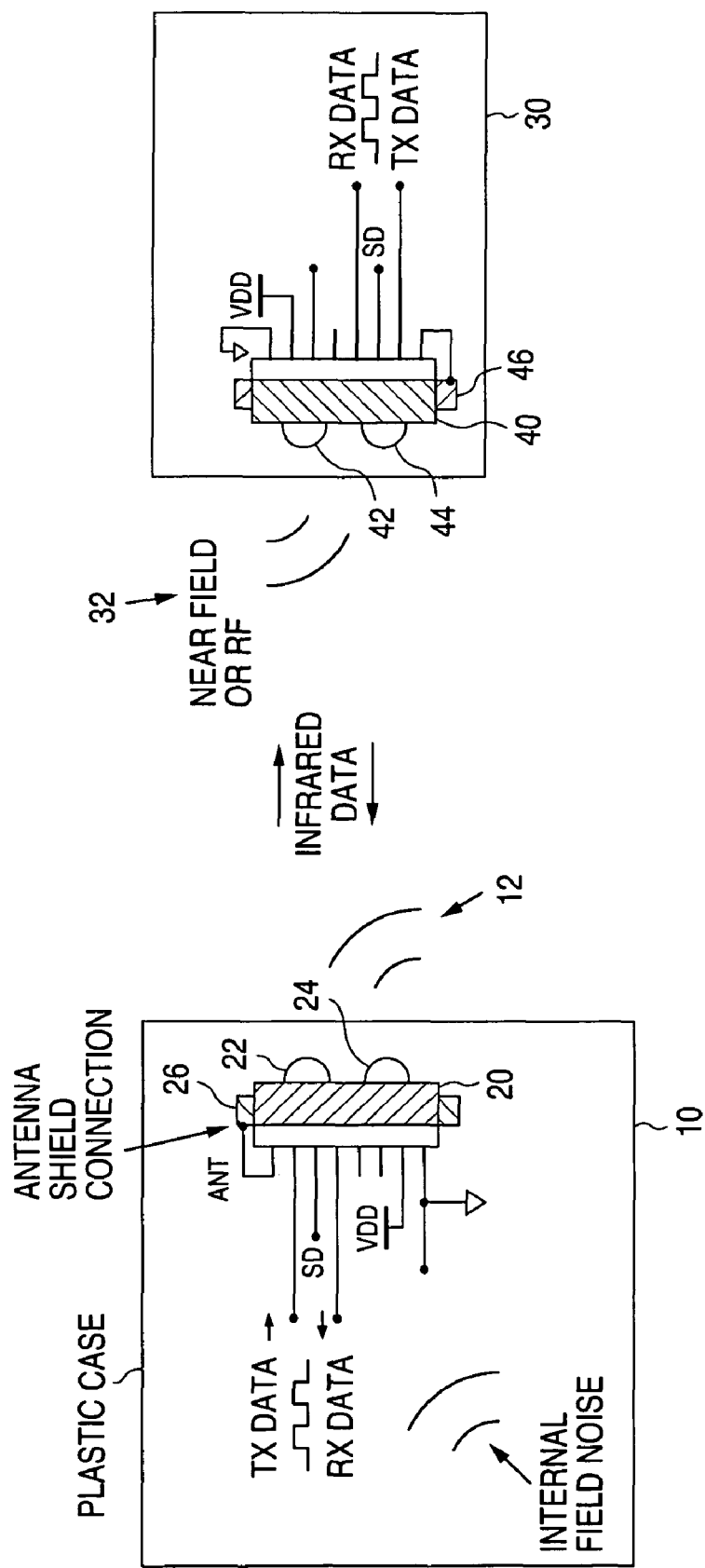
FIG. 1 is a cross-sectional diagram illustrating a communication link having two devices, where each device includes an infrared transceiver and a near-field transceiver that utilizes a capacitive near-field antenna.

While some of the characteristics of an IrDA infrared communication transceiver may be viewed as limitations, these same characteristics can be advantageous, such as by providing eavesdropping security, implicit addressability, and ease of use over RF solutions. Also, IrDA transceivers typically have less than one tenth the cost, size, and idle receiver current consumption of comparable data rate radio frequency physical layer data transceivers.

At present, IrDA transceivers have approximately 30% penetration in Asian and European cell phone markets and nearly 100% of the PDA (Personal Digital Assistants) market. In year 2006, the total market for IrDA transceivers exceeds 250 million units.

Presently, there is significant market interest in using IrDA transceivers for increasingly larger file transfers. Due to the advent of small, low cost, high density memory both flash and small hard disk drives that allow over 1 gigabyte of data storage in small handheld devices; such as, cell phones, MP3 audio and video players, digital cameras, etc., there is strong interest in some form of low cost, connector-less, high-speed file transfer communication system. As of this date, very small, low cost 4 Mbps Fast Infrared (FIR) IrDA transceivers are available that have costs similar to 115 Kbps devices. These devices have ranges close to 1 meter. Higher cost and in larger packages, 16 Mbps Very Fast Infrared (VFIR) transceivers are available, and development of small module 16 Mbs devices are on going.

In addition, there is interest in Ultra-Fast Infrared (UFIR) devices that have transfer rates of around 100 Mbps. These higher rates would be desirable to allow downloading of large files from, for example, pay-for-use kiosks or from a user's library in a convenient amount of time. A typical MP3 song requires about one Megabyte or eight Megabits of memory per minute of play time while a TV quality compressed video takes about 1.2 Gigabyte or 9.6 Gigabits per hour of play time. At 16 Mbps, a 4 minute MP3 song would take 2 seconds to down load while a 2 hour video would take 20 minutes to down load. At slower 4 Mbps, these down load times increase by a factor of four. For MP3 songs, pictures and short video clips, the 4 Mbps and 16 Mbps transfer rates are reasonable fast for transfer-and-go applications but for transferring program videos, it is excessively slow. For full feature video down loads, a 100 Mbps would be more desirable, requiring a bit over 3 minutes for down load. Even better yet, data rate speeds of greater than 480 Mbps comparable to USBII would allow transferring a 2 hour video in about 40 seconds.

However, development of a low cost 100 Mbps IrDA transceiver may be many years off, let alone a 480 Mbps system. As the data rate goes up, the bandwidth and sensitivity goes down requiring higher transmit irradiance levels. A key issue is that 1 meter or even 20-30 cm range will never be possible at 100 Mbps with the standard IrDA 100 mW/Sr (Sr>Steradian) optical transmit level. Even at 16 Mbps in a small module, 1 meter range is probably not practically possible. Higher optical transmitter levels would require expensive solid state laser technology and eye safety issues would limit irradiance to a maximum of about 500 mW/Sr in small modules.

Consequently, at 100 Mbps, the practical transfer distance with a 100 Mw/SR optical transmitter would fall to only a few centimeters. At these distances, the IrDA point and beam paradigm becomes problematic due to optical alignment requirements of both receiver and transmitter. It would be better to use some form of proximity data transfer technique less critical of alignment and that has fewer technical hurdles to high speed data transfer.

Another issue becoming more of a concern for all wireless data transfer is security against unauthorized eavesdropping. Standard RF wireless systems have ranges of 100+ meters and are vulnerable. Short range IrDA already provides reasonable security by virtue of its 20-30 cm range. However, for financial transactions, which are typically fairly low data rate applications, even shorter distances in the 1-10 cm range may be more secure. For pay-per-use applications both very high speed data transfer and immunity against unauthorized eavesdropping is desirable.

Long range wireless systems also have implicit addressability or pairing issues due to numerous other devices within range. For example, a Bluetooth headset normally only needs to connect to a single device such as a cell phone, but there maybe dozens or even hundreds of users within Bluetooth range. Although Bluetooth and similar wireless protocols can co-exist with hundreds of users, pairing is critical; that is, both ends of the connection pair need to identify each other. Typically this requires each to device to acquire addresses and configuration parameters; such as, frequency, data rate, modulation, encryption, etc. Although the cell phone typically has a keyboard and display, making pairing data entry possible, it is still an inconvenient to enter this data. For a headphone without display or keyboard entering anything but very simple parameters is a severe obstacle to use. More typically, headphone and cell phone pairing use some synchronizing method or system to indicate that these two devices need to talk to each other.

One method for pairing is for the user to push a synchronizing button on each device at the same time. Each device looks via the wireless link for another device that is also has its synchronizing button pushed and assumes this is device it should pair with. Or, in the headphone/cell phone Bluetooth synchronizing example, the head phone is held close to the cell phone when a button on one device is pushed, it synchronizes to the device that has the largest signal that is presumably the closest. The latter requires RSSI (Receive Signal Strength Indicator) that may not reliably determine the range from the signal strength since the main purpose of RSSI is not ranging but determination whether a channel is occupied or available for communication. In addition, other Bluetooth devices may still be able to listen to the synchronizing process to facilitate eavesdropping. Even with encryption, devices need to pass starting keys back and forth, but if these are eavesdropped, security is compromised unless using large prime number based public key encryption systems. However, these public key systems are not always practical for these type of applications requiring extensive signal processing and access to a data base of large prime numbers, neither of these may be available in a battery powered headphone.

Transfer of configuration parameters is another application similar to file transfer. Unlike large file transfers, high speed is not necessary or desirable. An example is a modern digital hearing aid. These devices generally require an upload of various digital filter and gain coefficients; i.e., adjustments for each individual's hearing response. Typically, like financial transactions no more than several hundred bits of information needs to be transferred at very short range. Generally, it is desirable that some form of contact-less serial communication be used since a wire contact connection is problematic due to normal earwax accumulations and a connector is too large. Although a very small low speed IrDA transceiver module would work, it is not smaller than a mechanical contact and is larger than desired for a hearing aid. IrDA transceiver also requires an unobstructed optical window, which is undesirable from aesthetical reasons (a uniform, skin-like appearance of hearing aid is preferred).

Similar to passing parameters, in the same hearing aid example, it would be desirable to have a unidirectional or bidirectional low speed short range communication path between the hearing aid and cell phone that allows the cell phone to directly pass digitized headphone audio directly to the hearing aid digital signal processor. This allows the hearing aid to mute background acoustical noise while telephone speech is being received, in addition to audio shaping of the telephone audio for the hearing deficits. Again an IrDA transceiver could be used for this application except it is too large but also the IrDA transceiver is not normally placed on the cell phone in a way to beam into the ear.

A more convenient solution proposed for wireless pairing has been the use a capacitive touch or proximity modulated carrier based near field system to provide pairing communication. Although this concept is viable, its cost is similar to that of any radio system. Argue-ably, 115.2 Kbps IrDA transceivers can provide this function at lower cost than a modulated carrier based near field system. Currently, these systems require only 1.2 sqmm of silicon plus a 1 sqmm photodiode and an infrared LED in a simple plastic lensed module. Total semiconductor costs are less than $0.15. Although, the near-field modulated carrier systems proposed for this function have data rates of 100 Kbps to 424 Kbps, this is not a compelling speed for proximity file transfer since it does not approach the speeds of existing Wi-Fi wireless, USBII, or even high speed IrDA.

Similar to the above example, various near-field technologies have been used or proposed for decades to perform low to medium speed communication in a limited proximity, often unidirectionally. Near-field is typically understood to mean the region within one wavelength of an antenna, where the electric and magnetic fields are not related to each other solely by the characteristic impedance of free space. Near-fields are the larger non-propagating fields of an antenna. Conventional radio communication arises from the propagating far-fields although it will work in the near-fields.

Antennas much smaller than a half wavelength radiate very poorly at far-field or long ranges even though they have very large near-fields. The far-field power radiation efficiency of these antennas is proportional to the inverse of the fourth power of their driving frequency voltage or current. Despite their poor far-field radiation resistance in the near-field, these short near-field antennas can also have very wide bandwidth, much wider than a half wave dipole in the far-field. Both of these characteristics make it possible to have wideband communication at short distances with good signal to noise while keeping far-field radiation below regulatory radiated limits for general electronic devices. Consequently, most near-field communication systems use antennas that are much smaller than the wavelength. U.S. Pat. No. 5,437,057 provides a description of inductive near-field transmission.

One advantage of a near-field system is that it can transfer significant power over a very short variable distance, e.g. less than 1 centimeter, without excessive long range or far field radiation, e.g. on the order of 10 centimeters or farther. As a consequence, near-fields have been used to provide power for RF ID applications. Inductive carrier systems are typically used because low frequency (less than 10 MHz) power transfer is more easily and efficiently coupled with a high Q ferrite loop antenna tuned for resonance. Although capacitive carriers could be used, at frequencies under 100 MHz, it is difficult to transfer sufficient power through the at most several pico farads of coupling capacitance.

For capacitive near field, the transmit antenna is a sub-half-wave plate or wire driven with a voltage source and the resulting electrostatic near field is directly proportional to the antenna voltage. For inductive near field, the transmit antenna is a sub-half-wave loop driven with a current source, and the inductive near field is directly proportional to the loop current. For both, the field level is relatively independent of frequency as long as it is well below the antenna's characteristic frequency.

In this frequency range the largest part of the near-field electrostatic field coupling can be modeled as a small capacitor and the magnetic field coupling can be modeled as an inefficient transformer. Radiating fields will be a smaller contributor to coupling. FIG. 4 is a circuit diagram illustrating an example of a transmitter and receiver pair modeling capacitive near-field coupling. FIG. 5 is a circuit diagram illustrating an example of a transmitter and receiver pair modeling inductive near-field coupling.

In FIG. 4, a transmitter 300 includes a transmit driver 302 that drives antenna 306 that is also capacitively coupled to ground through capacitor 304. Transmit antenna 306 is near-field coupled to receive antenna 322 of receiver 320, where the resulting capacitive coupling is represented by capacitor 308. In this example, the transmitted baseband signal is received as a series of spikes that are input to transconductance amplifier 330, which compares the received signal to a REFERENCE voltage signal provided by voltage reference 336. The output of transconductance amplifier 330 is input to operation amplifier 340, which produces a received data signal.

In FIG. 5, transmitter 350 includes driver 352 that uses a transmit signal to drive an inductor 356 that is near field inductively coupled to inductor 362 of receiver 360. The transmitted baseband signal is received as a series of spikes that are input to transconductance amplifier 370, which compares the received signal to a REFERENCE voltage signal provided by voltage reference 376. The output of transconductance amplifier 370 is input to operation amplifier 380, which produces a received data signal.

Standard electronic components capacitors, inductors and transformers can be thought of as extreme near-field devices. For these devices the near-fields are used to transfer or store energy with over 90% efficiency. For near-field signal communication, efficiency of signal transfer may be much less than 1%. In fact, if the transfer efficiency is improved by making the antenna resonant, the far-field radiating efficiency also increases.

Commonly a near-field antenna will radiate mostly one type of near-field. A short wire or plane antenna relative to a dipole will have mostly electrostatic fields within its near-field and very little magnetic field while a small loop antenna relative to a dipole will have mostly magnetic fields and very little electrostatic fields within its near-field. Unlike far-field radio waves where any aspect of the environment that shields either the E field or H field will significantly attenuate the other field, with near-field this is not true. There is much less interaction between the two fields. This can be used to advantage depending on both the shielding and noise characteristics of the environment.

For example, induction loop systems have been used to send communication to induction pickup devices within the loop. The loop may be run around the room or area to allow communication within the area. Electronic dog fences are inductive systems that use a receiver on the dog collar to sense a signal in a buried wire via its magnetic component. When the dog gets within a few feet of the buried wire the received signal triggers a shock. The electrostatic component of the buried wire would be shielded by the ground conductivity but the magnetic component is much less affected especially at low frequencies much below the half wavelength size of the loop. The electronic dog fence takes advantage that the inductive near-field signal falls off rapidly only a few feet from the radiating wire.

As a result, one aspect of hand-held near-field systems is that they can provide large immunity to external electro magnetic interference by moving the proximity of the antennas as close as necessary to achieve good signal to noise. Small decreases in range will cause large increases in signal level. Generally, once the proximity needs to be less than a few centimeters, users do not differentiate differences in range necessary to make communication occur, especially on small handheld devices. Users can be guided with signal strength displays to encourage them to place devices within close enough range for good signal quality. Because of their larger signals and operation outside regulated frequency limits, and because they do not radiate, near-field transceivers are simpler than far-field systems without need for expensive RF components.

The signal level of both a capacitive and inductive near-field signal decreases very rapidly with distance. How it changes is a function of the size and shape of the transmitting and receiving antennas, distance and amount of local shielding. But importantly, near field antennas are more predictable to tune than far-field antennas. For example, on a capacitive antenna with a voltage driver or an inductive antenna with a current driver, extending the size of the antenna, will invariably increase field or range and increase loading on the driver. On a Far-Field system, increasing antenna size often degrades radiation efficiency in a non-intuitive manner.

Depending on the coupling, noise environment, and used model, near-field systems either use baseband data or modulate data on an RF (Radio Frequency) carrier. For baseband data, the transmitting antenna is driven directly by the serial data without carriers.

Far-field radio systems almost always use a carrier to deal with the strong frequency dependent amplitude and phase shifts arising from the far field propagation characteristics. In order to use baseband for far field communication requires extensive signal processing and dynamic characterization (training) to overcome the propagation path's highly variable effect on phase, time and frequency distortion of the signal. Historically, since dominant radio technology has always been far field, it is normal practice to apply far-field radio techniques to variable distance, large dynamic range near-field systems since the technology works very well without modification for near field. Consequently, if the antenna geometry is variable or if free space distance and orientation is variable, near-field systems are generally seen as a type of short range RF system and standard practice is design it as a standard radio system using a modulated carrier.

Although near-field systems don't have far field propagation impairments that are normally resolved with carriers, another reason for carriers instead of baseband is to deal with frequency dependent phase shift and delay arising from multi-stage amplification and gain control. Any variable distance radio system whether near-field or far-field typically has a 100 dB or more dynamic range between the noise floor and the maximum input signal level. In order to provide very large amplifying gain and to allow for gain control, radio receivers generally use several AC coupled bandpass amplifiers. Multi-stage amplifiers are especially necessary to achieve 100 dB of gain at very high frequency since gain of most amplifying circuits decrease with increasing frequency. Band pass amplifying creates significant non-linear phase shift outside of the amplifying band that would make demodulating a baseband signal very difficult. Simple window or hysteresis baseband demodulation requires a 6 dB per octave rolloff below the low frequency response corner to a frequency that is at least three times lower in frequency than the corner to prevent excessive under or over shoot. Excessive under or over shoot can cause spurious detection or shift the detect level on subsequent pulses, a type of inter-symbol interference.

In addition, for regulatory reasons, most radio systems use modulated carriers as a way to constrain the radiated power to certain approved narrow frequencies or bands. In general, baseband transmission is not allowed for far field radio. Again, since dominant radio systems can't use baseband, the use of baseband in variable range near-field systems is contrary to standard practice.

However, one problem with high frequency carriers on wider band near field systems is that there is a higher likelihood of violating regulatory radiated limits, especially if the data rate happens to be low. As the carrier frequency increases, the far field radiation power increases with the fourth power of the distance. The carrier bandwidth can be spread, helping to reduce the energy in a any single band below regulatory limits if the data modulation is sufficiently wide, typically above several Mbps. Low cost carrier based data systems typically need to use a carrier that is at least twice to ten times the data rate in order to allow simple modulation and demodulation techniques. Consequently, at 500 Mbps, a low cost nearfield carrier system, would require a carrier of 1 GHz to 5 GHz. Baseband systems don't have this issue since far field radiation does not arise from the static near fields but only from the change that is the edges of the baseband data. As the data rate goes up, the far field radiation also goes up proportionally but if the data is pseudo random, not having high percentage of repeating patterns, then the radiated signal is spread over a wide bandwidth with the energy per root/Hz relatively constant. The latter has a better likely hood of passing regulatory limits that tend to be structured in terms of peak power per given bandwidth. Consequently, for very high speeds, near-field baseband systems have advantages over carrier systems.

On large dynamic range systems that use AGC, offset that arises from fast AGC attack is generally a non-issue on carrier systems but a serious problem on baseband systems. Normally, when automatic gain control is applied in response to a signal, it will create significant amplitude low frequency offsets or spurious transients that can cause overload or signal distortion. On carrier systems these are normally blocked from being amplified by the low frequency roll off of each cascaded AC coupled bandpass amplifier. On a baseband system in order to achieve high gain while rolling off the low frequency corner at 6 dB per octave requires cascading DC coupled amplifier stages with a single pole gyrator type bias feedback. In such a system, when AGC causes attenuation within the gyrator loop, the low frequency corner moves downward in frequency as a function of the drop in loop gain. Since offsets created when the gain changes can be amplified to large values and because the gain around the loop drops, it increases the offset settling time causing signal distortion or bit errors. Conventional wisdom is that baseband is not suitable for the larger 100 dB dynamic range of any variable distance RF system whether near-field or far-field.

Of course the above offset problem can be avoided if AGC is not used within the loop on a baseband system. For 20 dB dynamic range where noise is significantly below the minimum detect threshold, AGC is not required. In all large dynamic range systems, AGC is necessary to create noise quieting, since by increasing the signal level, the gain is reduced, lowering the noise floor until sufficient signal to noise is achieved. Practically, for proximity communication systems, this means that a user moves the transceivers closer to each other until signal quality comes up enough for reliable communication.

Practically, capacitive baseband near-field systems typically have less than 20 dB dynamic range because coupling geometry is fixed, distances are less than a few millimeters, typically through non-air dielectrics, and environmental noise is low. These systems use capacitive baseband as a method to provide high voltage isolation or contactless communication such as between ICs or across circuit boards. In these uses, because the antenna geometry is fixed, they are seen as capacitors, albeit inefficient ones.

Despite their limited dynamic range, these capacitive baseband systems can operate close to the maximum switching rate of the current technology, which is a key reason they are being explored for inter-chip communication. Another advantage of capacitive baseband transceivers is that higher speed transceivers are transparently compatible with lower speed transceivers. They can communicate at their highest common data rate. Commonly, carrier systems must change carrier frequencies or modulation in order to change data rates.

Where variable distance capacitive baseband communication between devices with floating grounds is desired, conventional wisdom is that a differential capacitive antenna and receiver needs to be used. (U.S. Pat. No. 6,336,031, Schyndel). Even if a ground is present, differential antennas in the base band are seen as necessary due to large common mode ground noise, common mode field noise (from large electrostatic noise generators; such as, compact fluorescent lights, computer monitors, etc.). However, a limitation of a differential capacitive baseband system is the need to align the transmitter and receiver antennas to prevent polarity ambiguity unless a polarity independent coding scheme is used. Another limitation is that range is a highly variable function of alignment.

Longer ranges require significant gain making the systems vulnerable to noise. Noise can be reduced with bandwidth filtering, but on a baseband system, more orders of filtering than provided by a first order differentiated response causes signal overshoot, undershoot, or ringing, making data demodulation difficult. Modulated carrier systems don't have this issue. Generally any of the standard carrier RF amplifying or filtering circuits will cause these problems when used on baseband signals.

Another problem on high gain baseband systems is capacitive or inductive feedback from the receiver data output. On limited dynamic range systems with fixed antenna geometries, feedback coupling is normally more than 10 dB below the minimum receive signal and some positive dynamic feedback is desirable to provide hysteresis, good for eliminating unwanted slow edge transitions. However, on high gain variable distance systems receiver data output can be the largest digital noise source picked up by the receiving antenna since the receive output is often much closer to the antenna than the desired signal source antenna. Modulated carrier based RF systems are generally less vulnerable to this noise by limiting the slew rate or frequency response of the digital receiver output and by using a carrier above this frequency. Then bandwidth filtering can eliminate any disruptive feedback. However, as explained earlier, baseband systems cannot use a bandwidth filter with more than 6 dB per octave rolloff. This is another reason high gain RF baseband systems have not been considered viable.

One of the standard wireless short range methods for communication is far-field radio such as IEEE 802.11 data transceivers. Although these systems are effective communicating at ranges less than one meter, they are at least ten times more expensive than a baseband near-field system because they were designed for 100+ meter range and must meet certain regulatory frequency band operating requirements due to their higher radiated output. RF systems in development that will exceed 100 Mbps at 100 meter range will be even more expensive. A significant cost of any integrated far-field radio system is the very specialized antenna engineering efforts required for each product design-in.

It is the engineering efforts and cost of antenna design that makes shorter range and lower cost far field radio systems impractical. Although it is possible to build a one to three meter range far-field radio system that operates below regulatory radiated power limits, that eliminates expensive frequency determining components, that has wider bandwidth, and that uses simpler data modulation techniques, it also requires careful antenna engineering in order to achieve ranges in excess of a comparable data rate near field system. At one meter range, under regulatory limit far-field systems that transmit data faster than 100 Kbs only have about 30 dB of margin between noise floor and maximum signal. Since transmit radiated levels should be about 10 dB below regulatory limits to ensure safe regulatory conformance over normal production variation, this leaves only 20 dB margin above the receiver noise floor. If the antenna has more than 20 dB of loss over a dipole, then range will fall below one meter. Since most systems use the same transmit and receive antennas, this means that the receive antenna must have no more than 20 dB loss, and in transmit mode the antenna must have fairly predictable gain, perhaps with no more than +−6 dB gain variation. Both of these requirements can only be satisfied by proper antenna design and validation in the end product. These are significant cost impediments over existing IrDA transceivers. In addition, any efficient antenna even at 2.4 GHz, consumes significant printed circuit board area or must project from the case. If a customer is to incur these antenna engineering and size costs, they might as well spend a bit more for a wider connectivity, longer range IEEE 802.11 or Bluetooth system.

Near-field antennas are simple and don't have the costs of far field antennas. A key advantage of a small (<<half wavelength) near-field antenna, is that it can be driven harder to produce a larger near-field than the near-field from a larger more efficient radiating antenna. Near-fields from a small antenna fall off at a rate much faster than propagating far-fields. The near-field produced is fairly independent of frequency as long as the antenna is smaller than the half wavelength. To a first order, near-field electrostatic coupling is proportional to antenna surface area and inductive coupling is proportional to the loop area. Low frequency roll off is a predictable function of the receiving near-field antenna termination resistance. All of this means that near-field over short ranges can provide good signal to noise at very wide bandwidth without strict regulatory constraints and can be flexibly installed in a wide range of products without critical antenna engineering necessary for far-field systems.

Near-field communication devices are seen as having a good potential for short range, secure data transfer applications traditionally served by IrDA. Only recently with the advent of low cost, high density memory, suitable for handheld devices, has need arisen for low cost, very fast file transfer communication systems. However, due to the previously described factors, variable range modulated carrier based near-field transceivers have not been considered to be a competitive improvement over lower cost, higher speed, and smaller IrDA devices. Due to competition from Bluetooth and WiFi, the somewhat lower cost of existing RF ID based near-field carrier systems hasn't overcome their handicap of limited range and limited data rates. Very high data rate baseband capacitive near field systems are not seen as capable of variable range necessary for proximity communication.

Although high speed, short range near-field transceivers in electronic devices might be desirable, like any new communication protocol or medium, achieving market success has always been extremely difficult since there is no installed base of applications or compatible near-field transceivers to allow new adopters to immediately use their product. Any new application competes against entrenched alternatives notably existing wireless technologies. Superior performance and lower cost of a new communication technology is no guarantee of quick market acceptance. More typically, any new communication media may take 5-10 years for market penetration.

Part of this slow acceptance of any new communication medium is because any new physical layer transceiver requires significant investment changes in product software and hardware. This is a high risk business development if it is unclear whether there will be a market acceptance and return on investment. With modern communication ICs, although the silicon fabrication cost of a transceiver may only be ten cents, the development costs may exceed millions of dollars. To recoup these investments requires a minimum market success of tens of millions of devices sold within five years.

For example, one problem of adding a near-field transceiver in an electronic product is that the antenna may require modifications to the product's case. Many electronic products have a conductive shield inside of their case to minimize EMI radiation. Although this case shield provides a good antenna return for the capacitive near-field transceiver, a separate field plate needs to be either added to the case or if an antenna on a circuit board is used, then a hole in the case shield needs to be provided and the antenna must be placed close to hole. For inductive near-field a loop must be provided for in the shield or slots cut in the shield so that a circuit board loop can radiate magnetic fields without excess eddy current losses because of the case shield. Although less than far-field systems, these are antenna costs that need to be incurred to use a near-field communication.

In one exemplary embodiment of the present invention, a high data rate, low cost 0-10 cm near-field baseband transceiver is added to an IrDA transceiver IC. Further embodiments call for combining a near-field baseband transceiver or receiver compatible with the IrDA/Near-Field transceiver with any standard far-field wireless data system or a wired data communication system. The near-field transceiver only adds about 20-50% increase in IC area or cost over the IrDA only transceiver. When combined with other wireless or wired transceiver systems it adds an even smaller increment in cost, yet yields a significant enhancement in secure, high speed bridging and file transfer communication. The near-field may be also integrated on chip with other RF wireless transceiver, like IEEE802.11$x$, Bluetooth or Zigbee.

The IrDA/Near-Field transceiver has two operating modes 1) a 0-500 Mbps 0-10 cm range near-field baseband mode and 2) any of the standard IrDA speeds 115.2 Kbps, 1 Mbps, 4 Mbps, or 16 Mbps. Both modes are compatible with standard IrDA modules and controllers. This dual-mode transceiver, similar to the reasons for dual and tri-mode cell phones, allows a ready method to grow an installed base of a new higher performing wireless communication standard while staying back compatible with the existing IrDA installed base.

The use of IrDA/Near-Field data transceivers may provide a number of benefits depending upon the particular application. For example, data speed may increase by approximately 100 fold at 0-10 centimeter range over either IrDA or RF Wireless and may increase 10 fold over IEEE 802.11g. A wider proximity communication arc may be obtained than the +−15 degree IrDA cone. A shorter range, secure, well defined proximity range may be obtained rather than the large ambiguous range of Far-Field RF.

An IrDA/Near-Field device may have less than $\frac{1}{10}$ the cost of 11-54 MHz 802.11 or 1 MHz Bluetooth with less than a 20-50% increase in the already very low cost IrDA transceiver. It may be possible to obtain rapid, low cost product design-in for IrDA/Near-Field because it is compatible with IrDA controllers from 115.2 Kbps to 16 Mbps. Further, the data stream transmit, receive, and half duplex turn around are essentially transparent. Also, IrDA high speed mode switching may be transparent when near-field transceivers are combined with a 115.2K IrDA transceiver.

In IrDA/Near-Field applications, no separate antenna is required and no special hole or modification to an electronic product's EMI shield required for shield antenna since the IrDA plastic infrared window is non-conductive. For Near-Field antennas combined with standard RF wireless or wired communication systems, the near-field antenna is simpler and easy to add to the Far-Field system. Further, IrDA/Near-Field implementations may be compatible with existing IrDA modules so that only minor circuit board changes may be necessary.

Near-field generally provides high security from eavesdropping beyond its 10 cm range. Even higher security (0-3 cm) may be obtained by transmitting just from the shield or a smaller transmit antenna. In near-field baseband mode, the transmitter radiates a fixed energy per bit, providing a constant radiated power per Hz independent of the data rate. This maximizes signal to noise while staying under regulatory radiated limits. The high speed near-field baseband mode may be backward compatible with lower speed IrDA transceivers. By being backward compatible, new near field IrDA transceiver may be able to "piggyback" onto high volume IrDA production and deployment, which facilitates rapid building of an installed base of a higher performance alternative to IrDA.

IrDA/Near-Field or near-field may also be interfaced to the Universal Serial Bus (USB) to allow low cost, high speed bridging to the dominant USB short range wired data system. Further, a large installed base of IrDA/Near-Field devices in cell phones may make it desirable to install compatible Near-Field transceivers with other wireless and wired transceivers. Also, IrDA/Near-Field may provide a simple method to synchronize wireless communication systems, either by mutual transfer of pairing data or by simple simultaneous flagging. Still further, near-field may provide a better audio link between a cell phone and a hearing aid and a simpler method to upload hearing aid coefficients.

FIG. 1 illustrates an IrDA transceiver module with a metal shield that is 7.3×1.9 millimeters. Since IrDA transceivers are placed on the PC board edge to allow access to a plastic infrared transparent window, the IrDA transceiver shield can be used as an antenna for the near-field data circuit integrated in the module's IrDA transceiver IC. In the near-field mode, the infrared window acts as a proximity aiming mark since the module shield is behind this window. If the product case has an electro-magnetic interference (EMI) shield, then the window provides a non-conductive hole for fields to escape. By using the metal EMI shield as an antenna, an IrDA module vendor can use the dual mode IrDA/Near-Field integrated circuit (IC) in an existing IrDA module with little or no changes. In IrDA mode, the shield is grounded inside the IC. In near-field mode, the shield is connected to either the transmitter or receiver depending on the half duplex communication direction. The antenna shield may be configured as either a single ended capacitive antenna or an inductive antenna.

Figure 2:
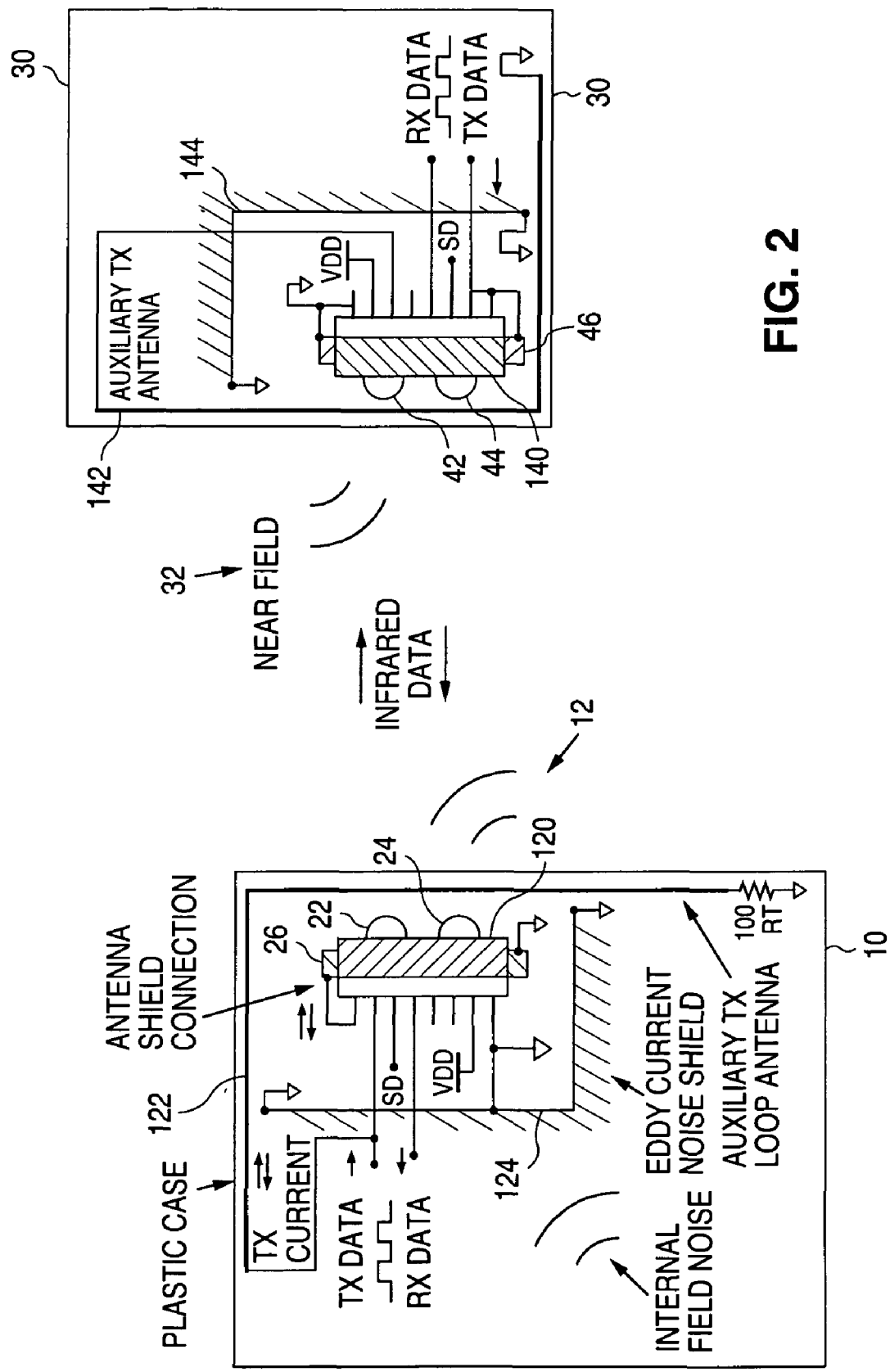
FIG. 2 is a cross-sectional diagram illustrating a communication link having two devices, where each device includes an infrared transceiver and one device uses an inductive near-field transceiver that utilizes a auxiliary inductive loop transmit antenna (TX) for transmitting a baseband data signal, while the other device utilizes an external shield as a capacitive antenna to transmit a baseband data signal.

FIG. 1 is a diagram illustrating a communication link having two devices, where each device includes an infrared transceiver and a near-field transceiver that utilizes a capacitive near-field antenna. In FIG. 1, a transceiver devices 20 and 40 are encapsulated in clear plastic cases 10 and 30, respectively, that permit infrared transmission and reception of infrared data signals via infrared lenses 22 and 24 for transceiver 20 and lenses 42 and 44 for device 40. Transceivers 20 and 40 also have near-field transceiver functionality for exchanging data via capacitive near-field antennae. In the example of FIG. 2, a capacitive near-field antenna for transceiver 20 is realized by electrically coupling an antenna input of the transceiver 20 to a shield 26 for the transceiver. Likewise, a capacitive near-field antenna for transceiver 40 is realized by electrically coupling an antenna input of the transceiver 40 to a shield 46 for the transceiver. When transceiver devices 20 and 40 are placed in close proximity to one another, the transceivers are able to exchange data through the use of near-field or radio frequency (RF) electro-magnetic signals 12 and 32. Note that the transmit data inputs to transceivers 20 and 40 may be coupled to their respective external shields 26 and 46 in an embodiment that employs baseband data transmission, in which case the signal applied to the transmit data input is used to drive the external shield as a capacitive transmit antenna.

FIG. 2 is a diagram illustrating a communication link having two transceiver devices 120 and 140. Transceiver device 120 includes an infrared transceiver and an inductive near-field transceiver that utilizes an auxiliary inductive loop antenna for transmitting a baseband data signal. Transceiver device 140 also has its transmit data input coupled to the external shield 46 to illustrate that the external data shield may alternatively be used as a capacitive antenna to transmit a baseband data signal. In the example of FIG. 2, of the transmit data input of transceiver 120 is electrically coupled to one end of an inductive loop antenna 122. The other end of loop antenna 122 is coupled to a circuit ground through a resistor. A grounded eddy current noise shield 124 may be included to reduce the effect of internal field noise caused by devices external to the transceiver 120, such as a controller. Similarly, an output of transceiver 140 is electrically coupled to one end of an inductive loop antenna 142 with the other end of loop antenna 142 coupled to a circuit ground. A grounded eddy current shield 144 may also be included. In one example of operation, data transmitted by transceiver 120 via the loop antenna 122 is received by transceiver 140 via shield antenna 46.

A near-field transceiver compatible with an IrDA/Near-Field transceiver may also be a useful addition to other RF communication data systems both as a way to achieve higher data rates than the RF system and as a way to securely transfer data over short distances. A very short range baseband near-field data transceiver system is even lower cost than an IrDA communication system. The shorter range of the near-field system is more secure than the longer range IrDA system. At very short ranges of less than 1 cm, the capacitive near field system can be very simple, without high gain, broadband amplifiers, and automatic gain control (AGC). Its cost is so low that combining it with another system may be a minor design-in cost. It provides complementary benefits to other wireless communication systems both in synchronizing pairing and higher speed file transfer speeds, but it may also provide low cost bridging between wired systems, such as USB, and other near-field systems.

Including a low cost Near-Field system in an IrDA module may drive acceptance of a compatible near field system in other wireless and wired data communication systems by rapidly increasing the installed base of products. Notably, the inclusion of an IrDA/Near-Field transceiver in cell phones in lieu of the IrDA only module may be an effective way to increase the near-field transceiver installed base because the cell phone market is large in size and geographic scope and has high product turn over rates.

A differential capacitive antenna in baseband applications is normally assumed to have superior noise immunity due to its ability to reject common mode signals. In practice, it provides little benefit due to the asymmetry of most internal electrostatic noise sources.

Single ended antennas work by using the bulk of the product as the return antenna. Many engineers assume that ground noise or common mode environmental noise would make a single ended capacitive solution excessively noisy. While it is typically true that the external environment may present tens of volts of electric fields from power lines, and common mode ground noise may also have similar magnitude at frequencies to several hundred kilohertz due to switching supply noise or power line transients, etc. However, a key attribute of these environment signals is that they fall off rapidly with increasing frequency due to the effects of Electromagnetic Compatibility (EMC) regulation (see FIG. 10 of Recommendation ITU-R P.372-8). At low frequencies, these near-field signals, although large, do not propagate due to the poor radiation efficiency of the fractional wavelength antennas formed by electrical conductors, while higher frequency signals that might propagate are filtered or attenuated to prevent propagation. Because radiation efficiency increases with the fourth power of the frequency or 12 dB per octave, near field digital noise from modern electronic products needs to fall off at a similar rate to prevent radiation in excess of regulatory limits.

Consequently, a single ended, capacitive near-field receiver can reject the large amplitude, low frequency, signals while communicating at the higher frequencies. By terminating with the correct impedance, the antennas themselves can provide a 6 dB per octave attenuation with decreasing frequency below the maximum frequency of the system, rejecting virtually all of the lower frequency common mode and environment noise. A second order high pass filter can be added to further reject the lower frequencies. If any second or higher order high pass filters are used it is important that their low frequency corners are at least three to five fold below the dominant high pass filter, in order to minimize undershoot.

The dominant local electrical noise near any electronic product is due to near-fields generated by its own active electronics. For these noise signals, the pickup from a single ended antenna is virtually the same as a differential antenna since most of these local noise signals have a very strong gradient.

In many high speed electronic products the dominant near field noise tends to be inductive because ground planes and case shields tend to perform better as electrostatic shields than as inductive eddy current shields. Unwanted far field radiation is mostly correlated with high frequency currents on circuit board and ground plane gradients due to high frequency inductive effects. Consequently, in many products, the electrostatic high frequency near fields are lower than the inductive fields, making a capacitive near field system less susceptible to noise pickup than an inductive near-field system.

Another problem with the use of a differential capacitive antenna in baseband applications is that it suffers from phase ambiguity requiring correct orientation between the two devices that are communicating. The single ended capacitive technique has the advantage that the signal polarity is always phased the same if both near-field antennas are in proximity to each other. Similar to a differential capacitive system, inductive near-field is only phased correctly if the loops face each other. If the loop antennas are proximate but misaligned to one side, a phase reversal may occur. The reversal can be remedied by either the software or the receiver hardware protocol automatically flipping the data phase. For transparent IrDA compatibility, the capacitive technique is simpler since it requires no phase adaptation of the protocol. For example, in order to adapt a high speed serial protocol for phase inversion, the beginning frame preamble sync byte detector can look for both polarities of the sync bytes. If it gets two correlations in a row of one phase, then that phase is assumed to be the correct phase for all subsequent bits in the frame.

One significant issue with using the IrDA shield as a capacitive or inductive antenna in a high sensitivity baseband system is that the antenna shield may couple to the receiver output causing serious feedback. This feedback is identical to IrDA receiver output to photodiode input capacitive coupling. Consequently, the same feedback mitigation methods used on IrDA transceivers disclosed by Holcombe in U.S. Pat. Nos. 5,864,591 and 6,240,283 can be used.

Antenna Enhancements If the module manufacturer wants to make no changes to their module design, then the new input/output (I/O) needed for the antenna or antenna shield connection can be scavenged from other existing module I/Os. For example, many IrDA transceivers have a dual transmit input, one for high LED transmit current and one for low LED transmit current. One of these inputs could be sacrificed to allow the same pin count module to be used. Or, existing I/O can be multiplexed with various schemes to free up one or more pins without sacrificing existing functions.

To use an existing IrDA module design for IrDA/Near-Field, the printed circuit board (PCB) that the module is mounted on would typically need to be slightly modified since the shield is normally soldered to the PCB ground. When used as a capacitive antenna, the circuit board shield solder tabs would not be grounded on the PCB but would need to be tied to the antenna I/O pin of the module.

For an inductive near-field antenna, different PCB connections are made, one end of the shield is tied to ground and the other end is tied to the antenna I/O pin on the module. Another advantage of not directly tying the shield to an active pin on the module, is that it allows the option of connecting the antenna IO pin to a completely different antenna; such as, a field plate on the case or a longer trace on the printed circuit board, for example.

If the module manufacturer makes changes to their module, then they can add extra pins to the module or make the antenna I/O an internal connection to the shield via a mechanical contact, soldering the contact to the shield or by capacitance between shield and a large area trace on the module. The internal shield connection would allow an IrDA/Near-Field module compatible with existing PCB layouts. One problem with a mechanical pressure connection between shield and module is that it may not maintain a reliable ohmic connection over time. To remedy this, the manufacturer might need to solder the metal shield to the module contact. This adds a cost to the manufacturing process, but is effective for both capacitive and inductive antenna configurations. In the inductive configuration, one solder tab on the shield would normally be tied to ground.

For a capacitive antenna configuration, a lower cost method to couple the shield to the antenna input without soldering is to use a capacitor formed between the metal shield and the printed circuit on the back side of the module. If the back side of the board has a conductive plane over a large area of the capacitor and if the shield extends over this area making a flat close fit, even if there is not a good ohmic contact, there can be enough coupling capacitance to drive the shield with little attenuation. Because the coupling between the shield and the surrounding ground or module conductors may be less than 1 pF, only about 1-3 pF of capacitance may be needed to couple to the shield. In IrDA mode, when the antenna input is grounded, the shield would then be grounded through several picofarads. This still provides effective grounding for the very low noise charges picked up by the shield. Typically, capacitive coupling to the shield from local digital signals is less than several femtofarads allowing field attenuation by about a thousand fold even though the photodiode coupling to the shield may be thirty times greater than to the signal source. The net effect is still a significant drop in coupled noise to the photodiode input.

Some IrDA modules don't have shields. In this case, an antenna on the printed circuit board that runs in front of module will generally give good performance, whether the antenna trace is used as a capacitive or inductive near-field antenna. However, the shield may be a better antenna than the same size printed circuit trace for either near-field capacitive or inductive mode. This is because the IrDA module shield is typically spaced further from the board ground plane and conductors that both act as signal shields and also create near-field noise. Consequently, the IrDA shield near-field antenna may tend to have a better signal to noise than the printed circuit trace near-field antenna of the same size.

An improvement against local field noise is to add a noise shield (different than the module shield) behind the IrDA/ near-field transceiver module. An example of this approach is demonstrated in the shields 124 and 144 of FIGS. 2 and 3. This shield can be a ground plane on the surface of the board. This local noise shield reduces pickup of both electrostatic and magnetic noise near-fields from other active signal lines on the printed circuit board. However, it is important that this noise shield be close to the noise sources but as far as practicable from the shield antenna since it will also act as a shield against desired signals if is placed too close to the shield antenna.

Another enhancement to improve the range of the near field device is to augment the shield antenna with a larger auxiliary transmit antenna. This can be accomplished either by making sure that the IrDA shield driver is the same phase as the transmitter input in baseband mode, and then driving the separate auxiliary antenna with the same transmit signal input, as demonstrated by the transceiver 120 connection to antenna 122 in FIG. 2, or by adding a separate auxiliary transmit antenna driver pin on the module, as demonstrated by the connection of transceiver 140 to antenna 142 in FIG. 2. For carrier mode, the auxiliary antenna would preferably be driven from a separate module pin if not tied to the shield. See FIGS. 4 and 5 for examples of drive circuits. The auxiliary transmit antenna can also be in several different sections to allow transmitting from several different hotspots on the product.

Typically, the auxiliary transmit antenna 122 or 142 would be a longer trace run around the edge of the product but it might also be a larger plate or conductive trace on the inside of the case. During transmitting, both the shield antenna 26 or 46 and the longer transmit antenna 122 of 142 would be driven. During receiving, only the shield antenna 26 or 46 would be used. The larger auxiliary transmit antenna 122 142 may increase the near-field range by up to ten times or more. It is still desirable to use the small shield 26 46 as a receiving antenna, whether configured in capacitive or inductive mode. Making the receiving shield antenna larger would typically have no benefit, since the local noise generated by the product circuitry or nearby devices will usually be larger than the receiver amplifier noise. In addition, a small antenna, e.g. the size of the IrDA module shield, is easier to shield (as discussed above) from internal fields than a larger antenna, which will have proximity to a larger number of local noise sources. Consequently, increasing the size of the receive antenna may increase pickup of field noise even more than the increase in the receive signal. However, increasing the transmit antenna size increases the transmit signal field relative to the field noise. For example, an IrDA/near-field transceiver 120 140 might be placed in the corner of a cell phone to allow easy placement of the corner with respect to another IrDA/near-field device. In this example, the transmit antenna 122 142 might be placed around this corner to increase the range, e.g. on the order of three times or more.

Similarly, to increase the range of an inductive mode IrDA/near-field transceiver, a larger transmit (TX) loop antenna can be used while the shield loop can be used for receiving. About the same signal to field noise improvement occurs as with the electrostatic mode by use of the larger TX antenna. If the TX input driver is used, as shown in the connection of transceiver 120 to antenna 122 in FIG. 2, then the TX loop antenna 122 can be driven through a resistor to limit the current so that the TX input has sufficient voltage to drive the near-field transmitter.

In the embodiment of transceiver 120 and antenna 122 shown in FIG. 2, the loop antenna current limiting resistor is disposed at the ground end of the loop, in which case the TX antenna will act as both an electrostatic and inductive antenna. This allows the receiver circuit to switch between inductive or capacitive antenna mode depending on whichever gives a better signal to noise ratio against the local near-field noise. Of course, this would typically require more I/O pins to switch the antenna from a loop to a capacitive antenna.

Even if a larger separate TX antenna 122 142 is used, it may be desirable to have a short range security mode where only the shield 26 46 is driven by the transmitter. With only the IrDA module shield driven, the communication range would be limited to within less than 3 cm of the shield. This is because the near-field transmitter range is generally a more predictable function of transmitter antenna size and driven power. Since security breach is often a result of unwanted transmitter pickup, the transmitter of secure information can limit the valid receiving region to a small volume by limiting the transmitting antenna size and power.

IrDA/Near-Field Transceiver Integration: Another advantage that may be obtained from combining IrDA and a near-field transceiver is that the near-field transceiver can operate half-duplex in almost exactly the same way as IrDA. In half-duplex operation, both transmit and receive is possible, but not at the same time. Half-duplex in transceivers lowers the cost and implementation complexity by using the same frequency or bandwidth in both communication directions and avoids transmit to receiver overload or interaction.

A 115.2 Kbps IrDA with a near-field dual mode transceiver may be made transparent to many 4 Mbps or 16 Mbps controllers. The reason is that IrDA transceivers above 4 Mbps, and some above 1 Mbps, typically have a speed mode switch that selects between low speed, usually 115.2 Kbps, and higher speeds. A 115.2 Kbps transceiver with an integrated near-field transceiver could switch to near-field transceiver mode when the controller tells it to go to high speed mode. Of course, at 115.2 Kbps, the IrDA range may be in excess of one meter, while for near-field, the range would be reduced to merely several centimeters. During the 115.2 Kbps IrDA exchange, the software systems of both products normally communicate their capabilities. If they both had compatible near-field transceivers, they could prompt the users to place both infrared windows within several centimeters to allow very high data transfer rates.

Since IrDA transceivers above 1 Mbps already typically include a speed switch, it may be useful to add another switch mode for near-field. In fact, depending on the specific communication application, it may be desirable to have several different near-field modes. Some of these may be different data rates, sensitivity or transmit levels. Most IrDA transceivers switch speeds by using the SD pin to clock data on the TX input pin. The falling edge of SD is used to clock the data value on the TX pin. Although the falling edge of the SD enables the part, the TX input, if asserted, has no effect until it first returns to the TX disable state. This prevents transmit glitches while performing the speed serial shift programming. This scheme can be extended to shift a number of bits for other control states. Optionally, the internal shift register bits may be returned to a default value after some minimum amount of time that SD has not been toggled. This avoids the requirement of shifting all bits into the shift register every time a mode change occurs.

Half duplex turn around, i.e. going from transmit to receive or receive to transmit, on the near-field transceiver can function similarly to IrDA where the unit is normally in an idle receive state unless a transmit signal occurs, which immediately disables the receiver with or without transmit echo. When transmitting stops, the receiver recovers after some short latency period. With a high speed RF receiver, the transmit latency, i.e. the time that the receiver requires to recover from the transmit signal over load, can be much faster than in an IrDA transceiver, where the photodiode recovery can be tens of microseconds. A near-field wideband receiver can typically recover in less than a few microseconds.

Baseband innovations and carrier systems: The simplest and highest speed near-field transceiver uses baseband data to transfer data with a capacitive or inductive coupling. Both techniques are well known in the art. Demodulating the baseband data differentiated edges typically requires a type of low threshold hysteresis receiver. Capacitive or inductive coupling has various advantages and disadvantages depending on the performance constraints of the environment. Both techniques could be incorporated in the same module by adding a second pin to control whether the shield is configured as a capacitive plate or inductive loop.

Conventional experience is that modulated carriers, typically with inductive antennas, are more flexible and perform better than baseband, especially in capacitive mode, and that baseband is not suitable for high gain or large dynamic range systems. With the following modifications in circuit design, these limitations may be overcome resulting in a very high data rate, short variable range transceiver, that may be lower cost and simpler than a carrier based near-field system.

The receive signal of the baseband data is the differentiated edge of the transmitted data, since an antenna cannot receive or output a signal from a static field whether electrostatic or magnetic. The differentiated time constant is proportional to the antenna terminating resistance on the capacitive antenna or inversely proportional to the loop terminating resistance on the inductive antenna. If these are the principal time constants, then very little undershoot will occur. Detection after amplification is via a comparator that flips state when the incoming pulse of the correct polarity exceeds the detect threshold above the quiescent reference level. Normally, positive pulses will flip the comparator to one state while negative pulses will flip into the other state. Subsequent pulses of the same polarity will have no effect. Since noise can flip the detect comparator to the wrong quiescent state, a circuit that restores the detect comparator to the idle state after a period of time is necessary. In this application, the restoring timer should revert the detect comparator to the idle state in about 1 us to 20 us. This allows quick recovery from noise, but allows the near-field output to be compatible with IrDA protocol speeds including the 9.6 Kbps initial discovery speed. Faster recovery may shorten valid data pulses possibly causing data errors.

Figure 10:
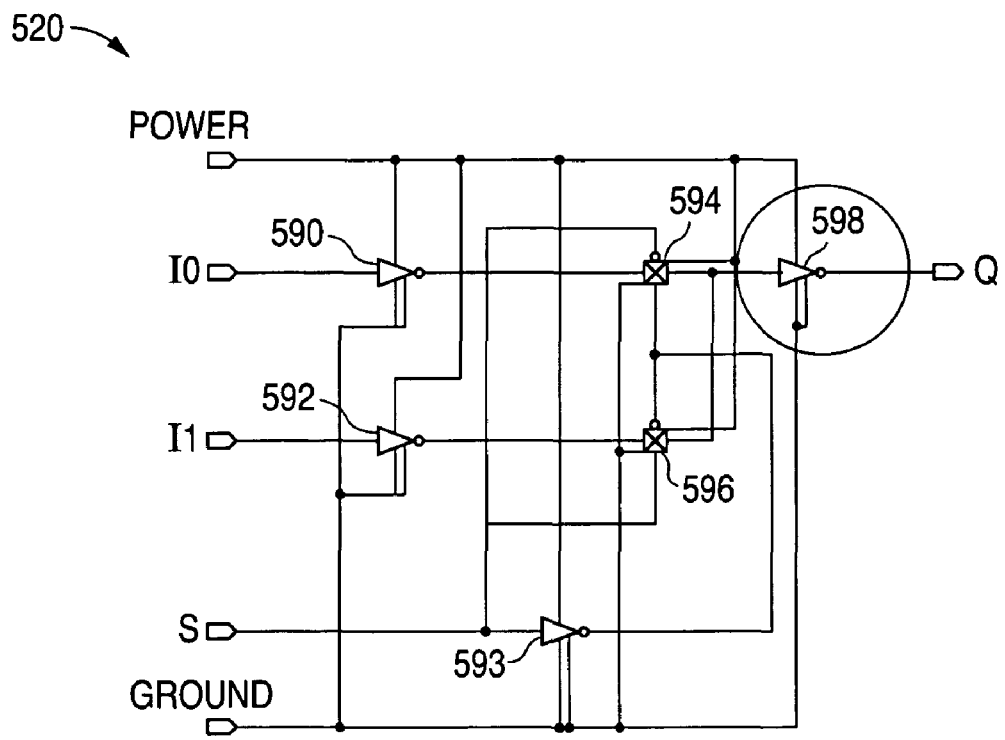
FIG. 10 is a transistor diagram illustrating one exemplary embodiment of a multiplexor circuit in the circuit of FIG. 8.
Figure 8:
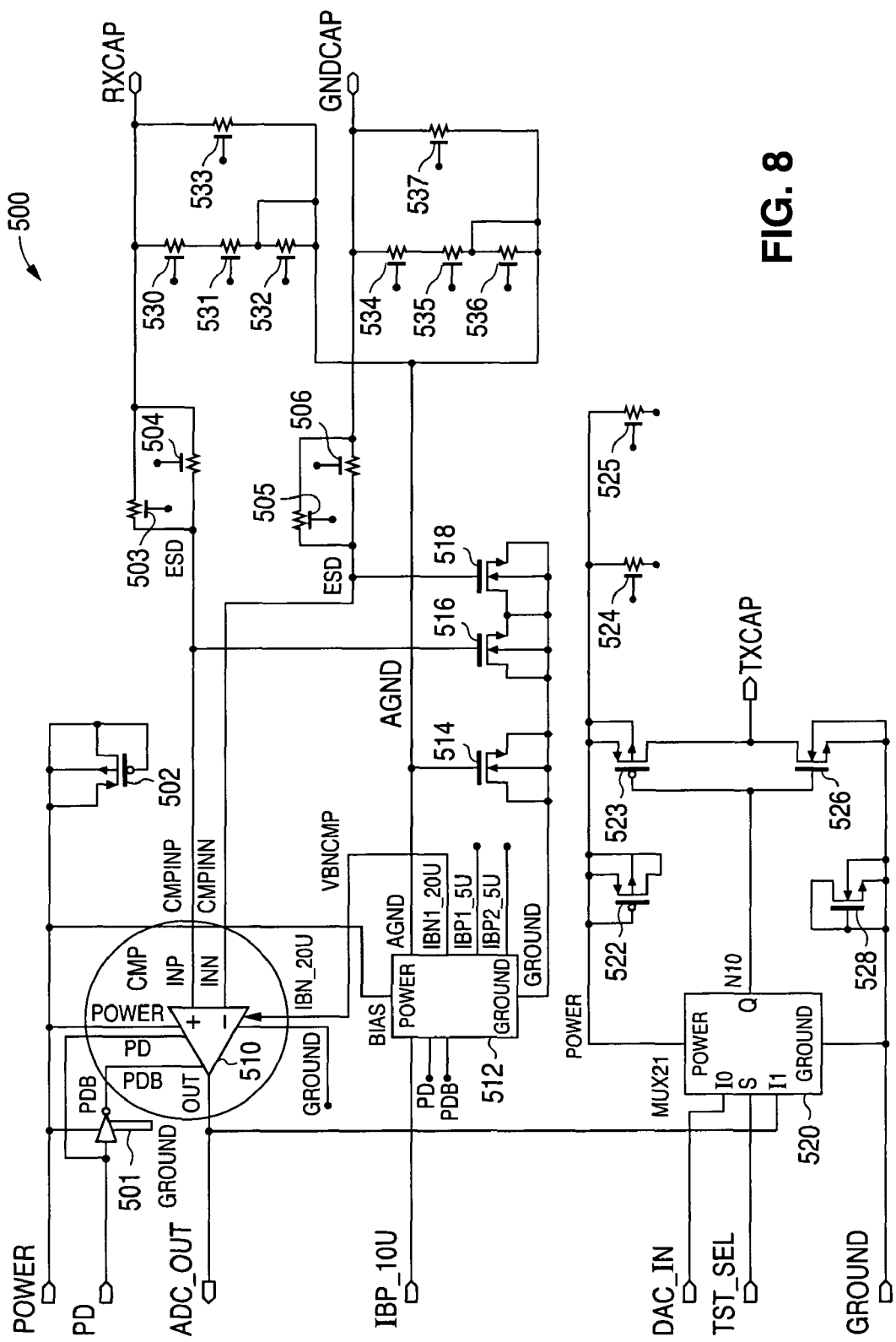
FIG. 8 is a transistor diagram illustrating an exemplary embodiment of a receiver circuit for use with a capacitive near-field transceiver device.
Figure 9:
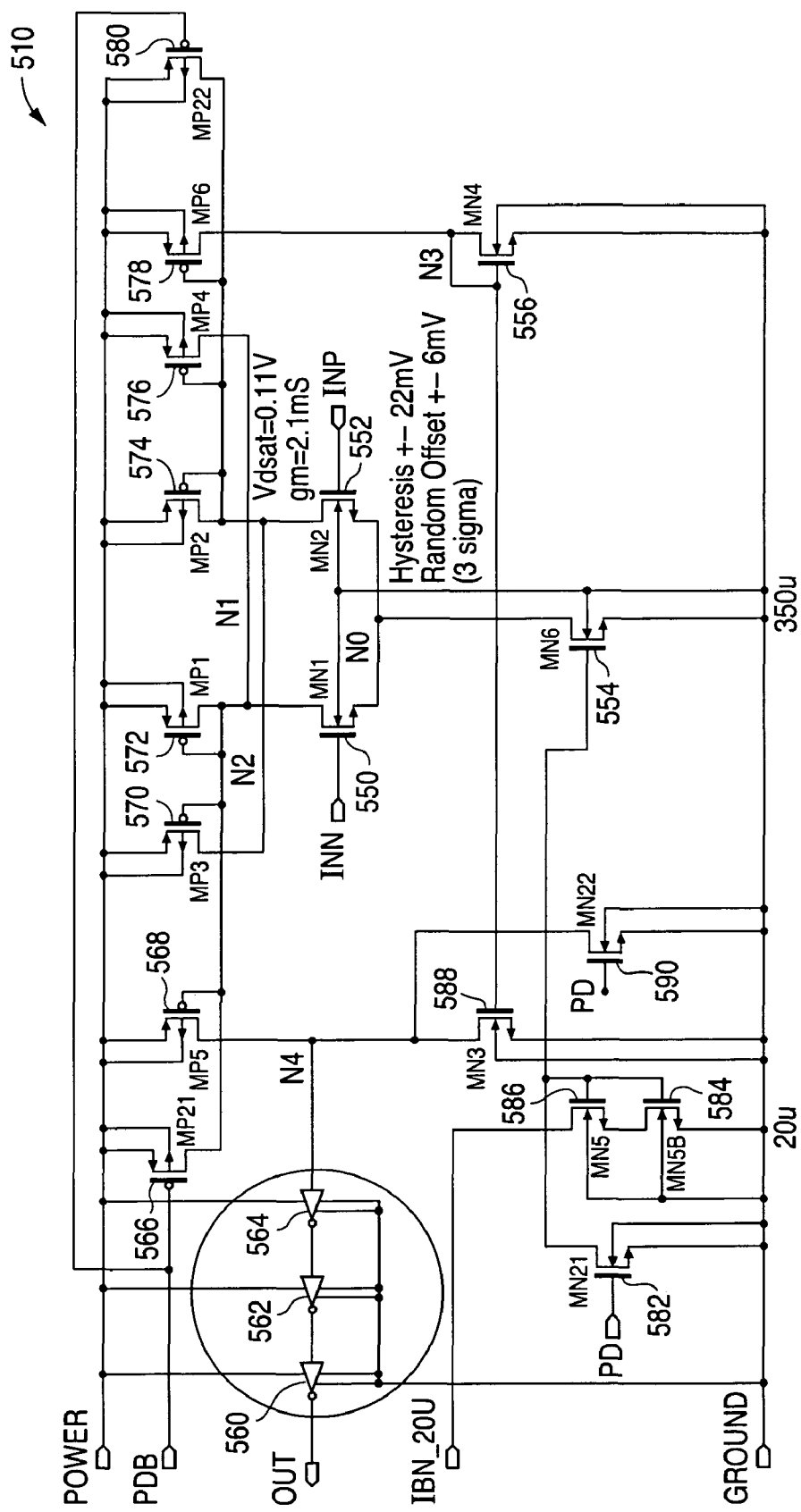
FIG. 9 is a transistor diagram illustrating one exemplary embodiment of a comparator circuit in the circuit of FIG. 8.
Figure 11:
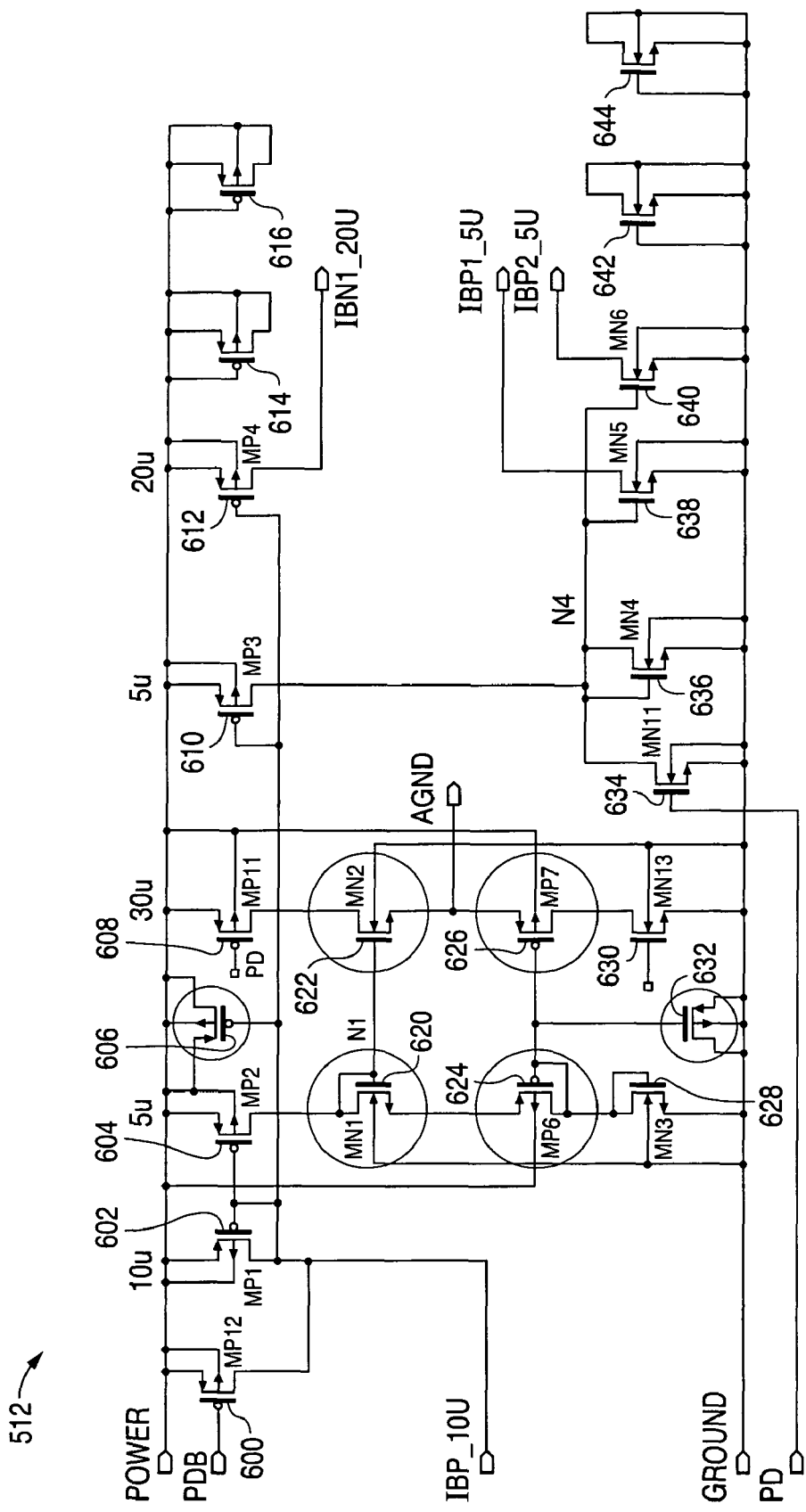
FIG. 11 is a transistor diagram illustrating one exemplary embodiment of a bias current generating circuit in the circuit of FIG. 8.

FIG. 8 is a transistor diagram illustrating an exemplary embodiment of a receiver circuit for use with a capacitive near-field transceiver device. FIG. 9 is a transistor diagram illustrating one exemplary embodiment of a comparator circuit in the circuit of FIG. 8 for detecting a received signal. FIG. 10 is a transistor diagram illustrating one exemplary embodiment of a multiplexor circuit in the circuit of FIG. 8. FIG. 11 is a transistor diagram illustrating one exemplary embodiment of a bias current generating circuit in the circuit of FIG. 8.

The transceiver circuit 500 of FIG. 8 includes a comparator 510 having a non-inverting input electrically coupled to external interface pin RXCAP for receiving a data signal. Comparator 510 compares the signal received via pin RXCAP to an analog ground signal input at external interface pin GND-CAP, which is typically capacitively coupled to a circuit ground potential. Comparator 510 compares the received data signal to the analog ground signal to generate a digital output signal that is output from transceiver circuit 500 via external pin ADC_OUT. FIG. 9 is a transistor diagram illustrating one example of a comparator circuitry suitable for use as comparator 510 of FIG. 8.

Biasing for transceiver circuit 500 is provided by biasing circuit 512, which converts a reference current input via external interface pin IBP_10U to the biasing current signal needed to bias the circuitry for operation. FIG. 11 is a transistor diagram illustrating one example of a biasing circuitry suitable for use as biasing circuit 512 of FIG. 8.

A multiplexer 520 is used to set transceiver circuit 500 into either an operational mode or a loop-back test mode. If the TST_SEL interface pin is set to a "1", then the signal output by comparator 510 is selected for output to the TXCAP pin, which drives an antenna. This results in the receive signal being looped back and retransmitted. If the TST_SEL pin is set to a "0", then the data signal input via interface pin DAC_IN is passed through to the TXCAP pin for transmission. FIG. 10 is a transistor diagram illustrating an example of multiplexer circuitry suitable for application as the multiplexer 520 of FIG. 8.

In a capacitive near-field baseband data system, the total current consumption during transmitting and receiving may be less than one tenth of a comparable radio frequency link with similar data rates. This is because the transmitting power is low and low noise, high current bias amplifiers are not required. Also, complex digital signal processing, VCOs, and mixers that are power consuming are typically not needed.

With some added complexity to the near-field baseband transceiver, switching between baseband or modulated carrier mode can be implemented. In the carrier mode, data may be modulated on a carrier frequency by use of one of a number of common modulation techniques; such as, amplitude shift keying (ASK), frequency shift keying (FSK), phase shift, etc. One solution to resolving the phasing ambiguity on near-field inductive systems is to operate them with a carrier. Also, in modulated carrier systems, because they operate over a narrower frequency range, the receive signals can be bandpass filtered to provide improved immunity against near-field noise. With a modulated carrier near-field communication system, the maximum data rate will typically be less than a base-band system, but may allow ranges approaching 30 centimeters while communicating at speeds faster than 16 Mbps.

A modulated carrier system can normally operate over a very wide bandwidth and over frequencies not allowed for longer range higher radiating systems, allowing use of lower cost, lower-tolerance, on-chip frequency sources and filters. Generally, any regulatory approved radio data system; such as, Wi-Fi IEEE 802.11, requires crystal controlled frequency sources. Consequently, a modulated carrier based near-field system is normally still significantly less costly than a longer range regulated radio system. Therefore it may be desirable to combine a near-field base band system with a simple modulated carrier system that operates at lower data rate, all combined with an IrDA transceiver. In such a tri-mode system embodiment, the base band mode allows faster data rate transfer at short range and the carrier mode will allow greater range than the baseband mode, but at faster speeds than the IrDA mode.

It is typically desirable that these near-field receivers have AGC (Automatic Gain Control), whether baseband or using modulated carriers. AGC creates noise "quieting" by reducing spurious noise detects as the signal increases amplitude. Typically, AGC reduces gain so that the detect threshold is about one half of the peak signal height to give a lower spurious detect rate and better pulse width accuracy. In this application, it is desirable that the AGC attack time occur in less than the high speed protocol training preamble, usually a few microseconds and the decay time should be long enough to hold up the AGC during the longest string of no pulses that might occur in the data stream. For high speed protocols above 1 Mbps, the no signal interval is usually 4-8 bits or about 5-10 us. So, in 5-10 us it would desirable that the gain would not increase more than about 3 dB. This would allow AGC latency recovery of 40 dB drop in about 100 us. If a near field system has a 40 dB signal range, then this means that the receiver will recover to maximum sensitivity in 100 us after receiving a maximum amplitude signal.

AGC provides quieting when signals are present. But when no signal is present, the gain will increase as a result of no detected signal and spurious detection may occur from near-field noise in the environment. In principal, with some controller designs this should not affect controller performance which looks for the correct starting sequence of data and ignores random data. However, if a controller has difficulties with excessive spurious noise when a signal is not present, it would be desirable to set the minimum detect threshold with an external component since the near-field noise may vary between different types of products. This allows the product end designer to adjust the minimum detect level to increase the effective range without excessive spurious outputs. Since input/output pins on IrDA transceivers are at a premium, with typically only 6-8 pins used for all power and functions, some type of detect adjustment multiplexed on an existing pin would be desirable.

As pointed out earlier, rapid attack gain changes from the AGC causes significant offset. This offset creates a significant signal, especially with the high gain DC coupled amplifier with a single pole gyrator type feedback. In order to remedy this, the AGC circuit is typically balanced, but may introduce a small deliberate offset at maximum attenuation that exceeds the worst mismatch. The offset should be anti-signal (opposite to the direction or polarity of the received signal) since the peak signal drives the AGC gain control downward. Otherwise, if the offset is in the same direction as the signal, then regenerative AGC attack will occur, causing AGC overshoot. It is preferable that the gyrator feedback is applied after the first gain control stage or attenuator so that the gyrator low frequency corner does not move with the AGC stage.

In another embodiment, the circuit is provided with a detector bandwidth that tracks the AGC level, which widens the bandwidth as the peak signal level increases. For low level signals, the detector bandwidth should be low, effectively lowering the detection noise allowing the detection of weaker, lower data rate signals. If the user needs to communicate at a higher date rates, then the user can place the transceivers closer together, which increases the signal level causing the AGC to increase and the detector bandwidth to widen. This method automatically adapts bandwidth for the signal level. However, depending on the local noise frequency and amplitude characteristics, it is desirable to allow the product designer of the end product to adjust the AGC bandwidth threshold, which is the AGC level at which the detector bandwidth widening starts to occur. The threshold should be set to start at least 6 dB above the background ambient noise level in order that the background noise not degrade the signal as the bandwidth widens.

In order to set this AGC bandwidth threshold, the near-field transceiver may have a separate pin for use with an external AGC bandwidth threshold adjustment resistor. An advantage of the dynamic control of bandwidth by signal level is that it allows for low integrated circuit (IC) bias current when no signal is present. While there is no signal present, the bandwidth will move to the lowest frequency or data rate, which typically requires lower amplifier and comparator bias and may be less than 100 uA. Only at higher bandwidth will the idle current increase, e.g. by one or two orders of magnitude, to allow wider bandwidths and faster data rates. This is a desirable attribute since most communication occurs in bursts with a low overall duty cycle, e.g. typically less than 1%. This feature may allow the average current consumption to be approximately two orders of magnitude lower than the current consumption at the maximum data rate. The idle current consumption may be lowered further by enabling the receiver at a low duty cycle.

Figure 3:
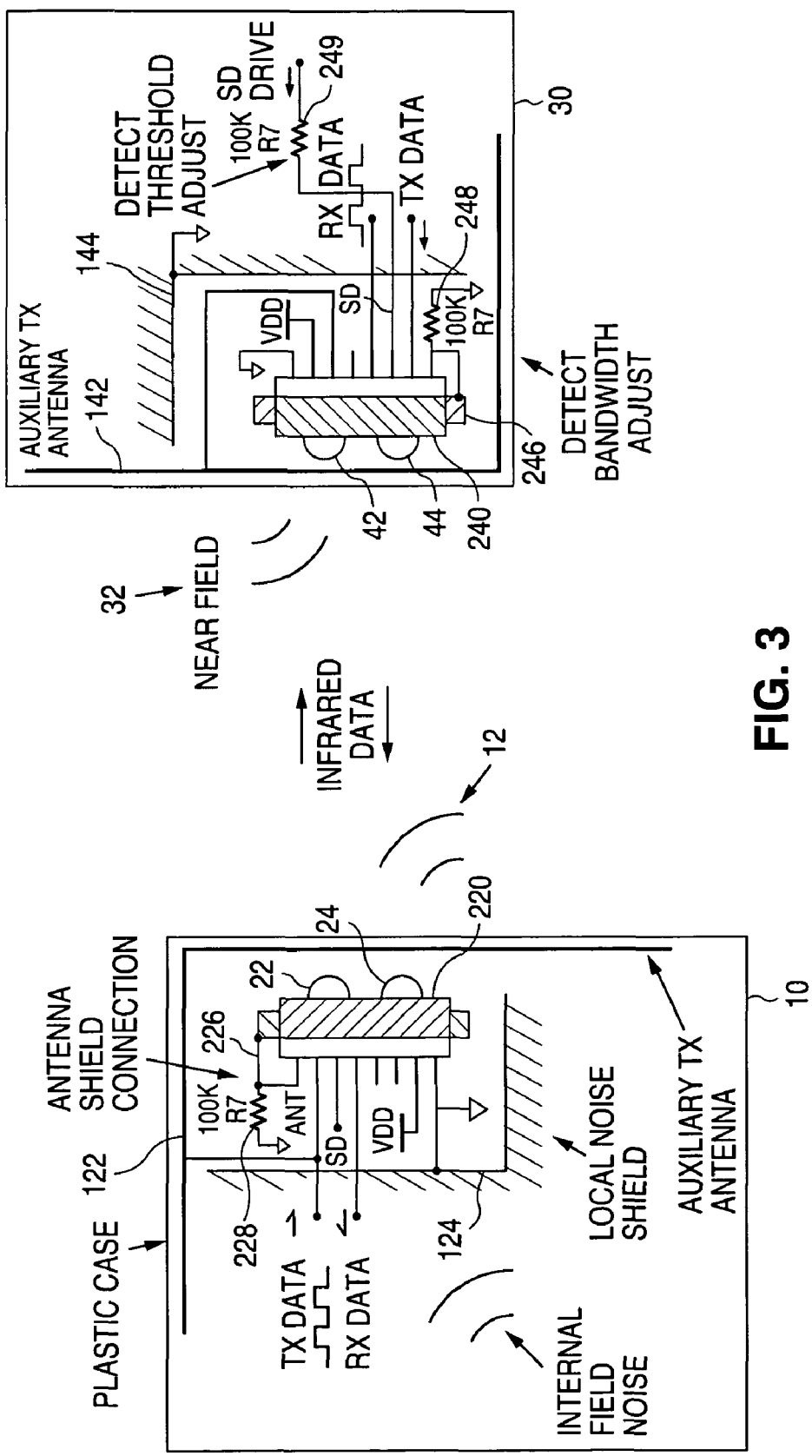
FIG. 3 is a cross-sectional diagram illustrating a communication link having two devices, where each device includes an infrared transceiver and a near-field transceiver that utilizes a capacitive near-field antenna as well as an auxiliary capacitive transmit antenna and adjustment resistors.

In another embodiment, the I/O pins for the adjustment resistors for both the minimum detect threshold and the AGC bandwidth threshold can be multiplexed with the antenna input and the SD pin in order to avoid adding more pins to the transceiver module. FIG. 3 is a diagram illustrating a communication link having two devices, where each device includes an infrared transceiver and a near-field transceiver that utilizes a capacitive near-field antenna as well as an auxiliary transmit antenna and adjustment resistors. In the example of transceiver 220 of FIG. 3, an antenna pin is use to connect to a shield antenna and to an adjustment resistor. In the example of transceiver 240, the SD pin is used to connect a resistor for adjusting a detect threshold and the antenna input is used to connect a resistor for adjusting a detection bandwidth.

The antenna input can be multiplexed by coupling it to the receiver amplifier input with a capacitor and then biasing the antenna input pin with a voltage source through a resistor. By tying an external resistor to ground on the receiver input, the input voltage level or input current can be measured and used to adjust the AGC bandwidth threshold. Typically, a lower voltage level or higher current associated with a smaller resistor would raise the AGC bandwidth threshold while also increasing the rejection of low frequency noise components by decreasing the antenna input time constant.

The SD pin can be multiplexed by placing an adjustment resistor between it and the SD digital driver. Since SD is normally driven to ground by a CMOS driver from the controller when the part is enabled, then if the transceiver is in near-field mode, the internal IC circuit can apply an internal voltage below the SD logic switching threshold but above ground. Typically, this voltage might provide a pull up to 0.4V, but from a unidirectional (diode like) current limited source. The current level flowing from the SD pin to the SD driver, set by the external resistor in series with the SD pin and the SD driver, sets the detect threshold. If the SD driver rises above the 0.4V level, then the SD input also rises above the 0.4V level causing shutdown when it rises to about the logic threshold, e.g. around 0.8V-1.2V. A minimum value set resistor can be included internally in the IC, so that the extreme sensitivity value can be set if the SD pin is directly driven without an external set resistor.

It is also possible to reverse the functions of these two adjustable resistors, so that the resistor on the antenna input sets the minimum detect threshold and the resistor in series with the SD pin sets the bandwidth offset.

In another embodiment, instead of using external resistors, either of these parameters may be digitally adjustable by expansion of the SD TX input serial shift function normally present on high speed IrDA transceivers. This allows the shifting of a number of bits into an internal shift register for programming these and other parameters.

As noted above, a high speed near-field RF transceiver that can operate in either baseband or carrier mode may be added to products that currently use IrDA transceivers. A combined 115.2 Kbps IrDA transceiver with a 16 Mbps with a near-field transceiver could be both lower cost and much smaller than a 16 Mbps IrDA-only transceiver. Since 16 Mbps digital controllers have been available for a long time at low cost, the new availability of a small, low cost 115.2 Kbps IrDA/16 Mbps with a Near-field transceiver may facilitate rapid replacement of both slower IrDA transceivers and controllers. Quick development of higher speed controllers could follow since low cost, 100 Mbps with near-field transceivers would be available. Historically, next generation IrDA digital controllers have been developed many years before a compatible small, low cost IrDA transceiver becomes available.

Combining Near-Field transceivers with other Wireless and Wired Communication Transceivers Adding the above described near-field transceiver and related innovations to a standard far-field wireless transceiver provides mutual benefits in three application areas of high speed file transfer, wireless synchronization, and security. First, a baseband near-field transceiver provides higher data speed, e.g. one the order of 10× far-field wireless data rates, for file transfer at a small increment in cost. Second, a baseband transceiver can provide a convenient method for synchronizing paired far-field wireless transceivers. Third, it can provide a secure method to transfer encryption keys for longer range wireless communication systems. It is desirable for the combined near-field and wireless system to be compatible with a IrDA/Near-Field transceiver in order to exploit the utility and facilitate the acceptance of this baseband near-field method of communicating between electronic products.

Adding a near-field transceiver to wireless and wired transceivers that is compatible with an IrDA/Near-Field installed base may increase the utility of both systems by providing a low cost, convenient, connector-less file transfer system between desktop computers and portable battery powered, handheld products; such as, cell phones, digital cameras, MP3 players, video players, laptop computers, etc. The IrDA/Near-Field capacitive system would provide a ready installed base.

When adding a near-field transceiver to a non-IrDA communication system, there may not be a shield available for use as an antenna. However, like the IrDA module without a shield, antennas both small and large for both long range and short range secure communication can be readily added to obtain some of the performance features discussed above.

Figure 6:
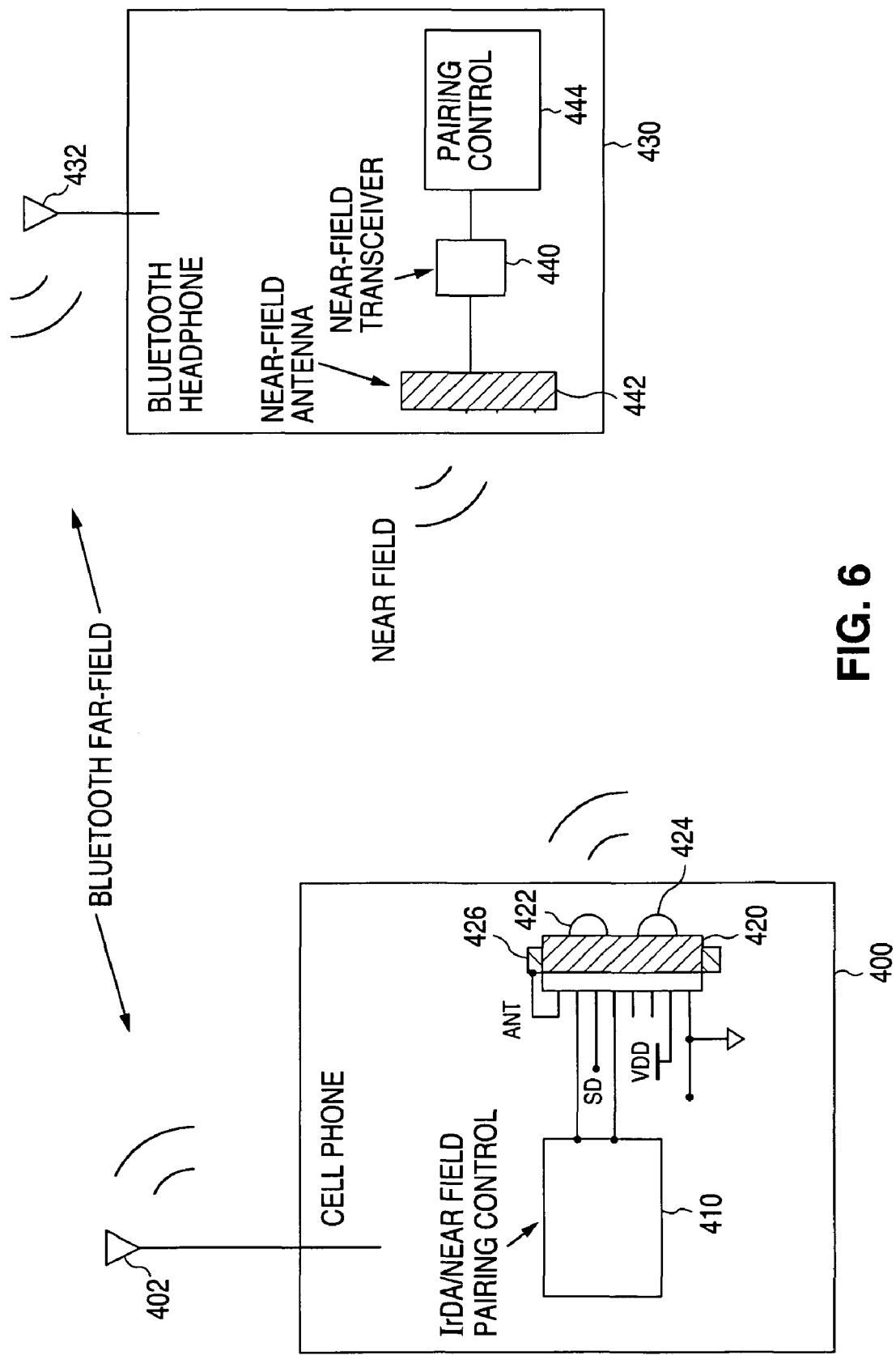
FIG. 6 is a diagram illustrating an example of a near-field communication link between a cell phone device with near-field enabled IRDA transceiver and a Bluetooth headphone device with near-field transceiver for use in pairing control.
Figure 7:
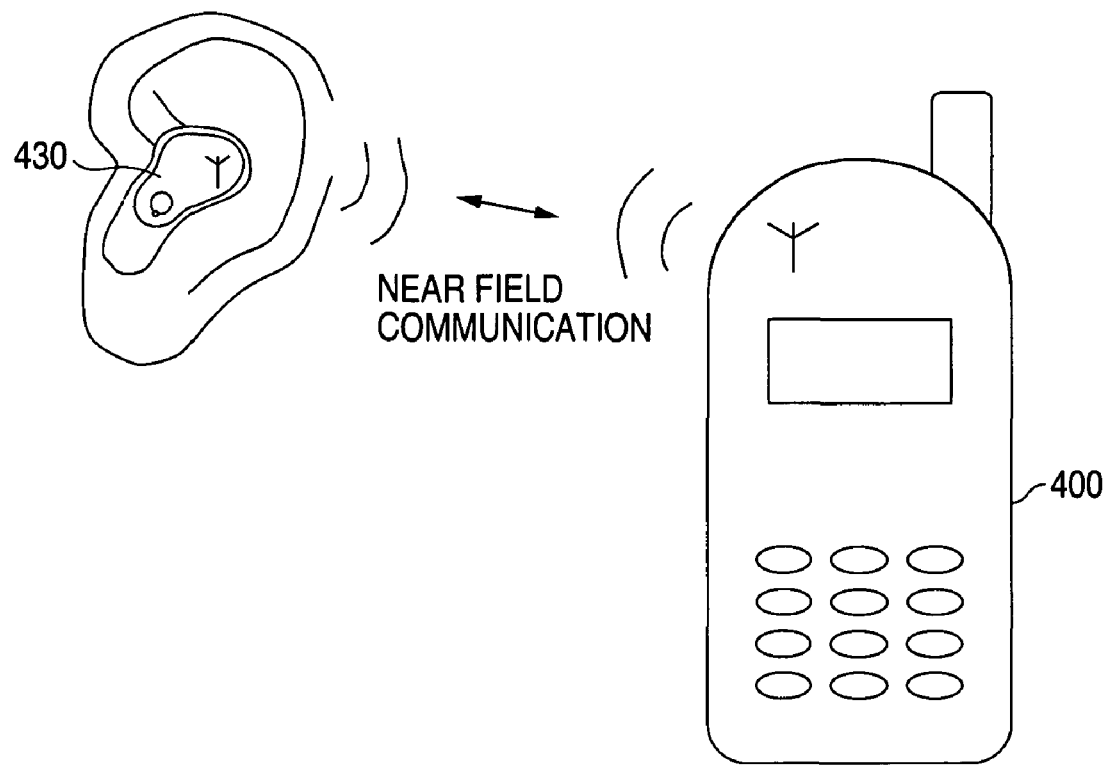
FIG. 7 is a diagram illustrating an example of a near-field communication link between a cell phone device and a hearing aid device.

For pairing between two wireless transceivers, a baseband near field system can be operated as either a short range communication system for securely passing synchronizing data between two far field wireless transceivers or as a relatively simple proximity synchronizing flag. FIG. 6 is a diagram illustrating an example of a near-field communication link between a cell phone device and a Bluetooth headphone device for use in pairing control. In the example illustrated, cell phone 400 includes an IrDA and Near-field pairing controller 410 that is connected to transceiver 420 that is capable of both infrared and near-field communication. Likewise, Bluetooth headset 430 includes a near-field transceiver 440 having a near-field antenna 442 for receiving the near-field signal transmitted by transceiver 420 of cell phone 400. Headphone 430 also includes a pairing controller 444 that uses near-field transceiver 440 to communicate with pairing controller 410 of cell phone 400. This arrangement allows the near-field communication link between transceivers 420 and 440 to be used to exchange messages in a protocol for pairing the headphone 430 to the cell phone 400. FIG. 7 illustrates an example of an application of the pairing arrangement of FIG. 6, where the headphone 430 is a hearing aid device.

When the near-field system is operated as a communication link, a minimum level of protocol is required to support serial communication between two devices. This allows for the safe transfer of data without risk of eavesdropping, though with the added cost of a serial communication controller or software stack on the host microprocessor. If one side of the connection is already an IrDA/Near-Field transceiver, then the IrDA controller may transparently provide this functionality. However, if the other side of the wireless connection does not have an IrDA controller, then it may be necessary to add a controller or provide additional software for the wireless controller, which may increase cost.

A lower cost solution is to have either one or both sides of a communication link without an IrDA controller perform a simple near-field activity flag that is functionally similar to pushing the synchronizing buttons on both devices. If one device is transmitting a near-field repetitive pattern, then the receiver will output the repetitive pattern when placed in close proximity to the transmitting near-field device. The repetitive pattern may then be recognized as a synchronizing signal by the wireless device that wishes to synchronize and is placed close to the transmitting device. Either the device receiving the synchronizing signal can send back a simple acknowledge pulse or pattern between the requesting device's transmission of the repetitive pattern, or the wireless link can command a change in near-field transmitting pattern of the other device to confirm that the device that is sending the near-field signal is the same one as the wireless link. These patterns and responses can be generated either by an IrDA controller driving an IrDA/Near-Field transceiver or by a simple logic sequence, if driving only a Near-Field transceiver that is used exclusively for synchronizing. This method of pairing is not highly secure, since all of the pairing information is sent over the wireless link, but it does avoid the need for a near-field communications controller or software stack.

Integrating a USB transceiver with a near-field transceiver compatible with an IrDA/Near-Field transceiver illustrates an example of synergy between wired and near-field integration. A near-field connection on USB ports would be useful, for example to facilitate USB communication between a personal computer (PC) and a battery powered, portable device; such as, cell phones or digital cameras. In small portable devices, even if a USB connector is available, it tends to be a small or non standard size that requires a special bridge cable supplied by the camera or cell phone vendor. These cables often get lost or misplaced creating frustration when needed for occasional transfers. However, convincing product manufacturers to accept any new wireless physical layer protocol to a USB interface, no matter how low the cost or high the performance, is virtually impossible without a significant installed base or a rapidly growing installed base. As indicated above, by including a near-field physical layer transceiver in combination with an IrDA transceiver may allow the creation of a rapidly growing installed base by replacing IrDA transceivers on products in production or development with more desirable IrDA/Near-Field transceivers at only a slight increase in cost. In addition, providing an IrDA/Near-Field dongle for interfacing to a USB plug could facilitate bridging between USB and IrDA/Near-Field since USB to IrDA versions already exist. This allows ready back compatibility for the existing installed base of USB transceivers.

As an example, the largest single market for IrDA transceivers is cell phones in Europe and Asia. Many of these phones have integrated cameras. Users may want to transfer pictures from these cell phone cameras to computers using USB. Although a large installed base of IrDA cell phones exist, the bulk of these devices have IrDA speeds of 115.2 Kbps to 1 Mbps. If computer makers saw an installed base of 16 Mbps to 500 Mbps near-field transceiver capable cell phones, they might be more inclined to include USB to nearfield transceiver bridges in their products. In fact, the installed base of camera cell phones with IrDA transceivers exceeds the installed base of digital cameras with USB interfaces. So, it can be seen that high speed, near field file transfer transceivers on cell phone cameras may apply pressure for digital cameras to have compatible near-field transceivers to provide the same functionality that may be available in camera phones. Since virtually all digital cameras send data to PCs, this creates a similar pressure on PC vendors to add a near-field transceiver to a PC USB interface.

Another approach to integrating a near-field or short range RF transceiver with USB is to incorporate the near-field antenna around the computer peripherals, for example a computer keyboard. This has the advantage that the dominant keyboard interface is USB and the keyboard is often more user accessible than a USB port or near-field port on the computer, which may be placed under or behind a desk. If the keyboard is a wireless key board, then the other computer peripherals that are user accessible that might house the near-field antenna are the computer display monitor, the USB mouse, or the USB RF head for a wireless keyboard and mouse, webcam, or other USB Human Interface Devices (HID).

Another approach is to combine a near-field transceiver with a wired transceiver to use an optical transceiver similar to or the same as IrDA to provide parallel channel status, collision, and control signaling that cannot readily be included in the main half duplex near-field communication channel. For example, the USB protocol does not define a method to communicate or control these signals embedded in the main half duplex data stream; therefore, an optical transceiver or an IrDA transceiver with a simplified controller could provide this parallel channel.

Figure 15:
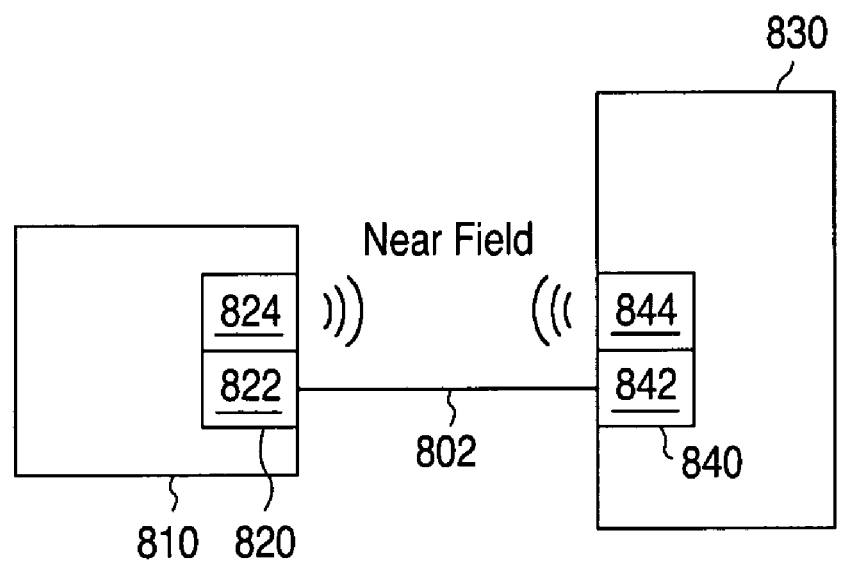
FIG. 15 is a functional block diagram illustrating an example of devices utilizing a USB transceiver and a near field transceiver, where the near field transceiver may provide an easily accessible data port or a secondary channel for a USB link.
Figure 16:
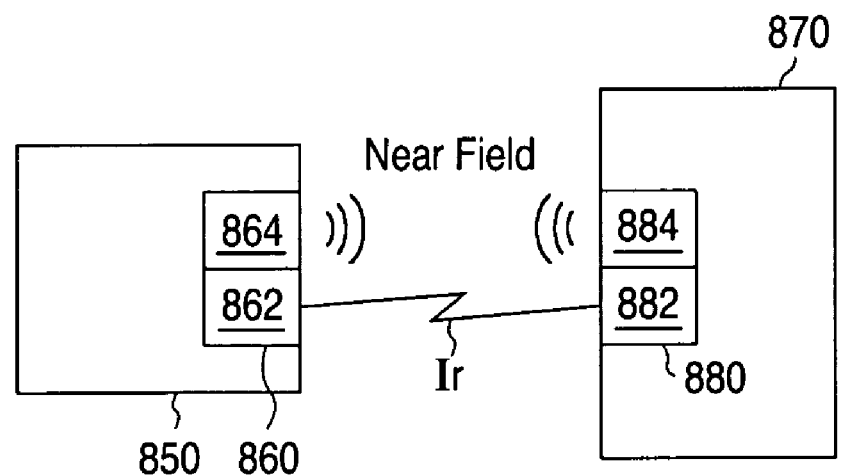
FIG. 16 is a functional block diagram illustrating an example of devices utilizing an infrared USB transceiver and a near field transceiver, where the near field transceiver may provide an easily accessible data port or a secondary channel for a USB link.

FIGS. 15 and 16 illustrate examples of devices equipped with a USB capability and a near field capability. In FIG. 15, a first device 810, which may, for example, be a keyboard, includes an interface circuit 820 that includes a wired USB transceiver 822 combined with a near field transceiver 824. Similarly, a second device 830 includes an interface circuit 840 that also includes a wired USB transceiver 842 combined with a near field transceiver 844. In one embodiment, near field transceiver 824 may be utilized to transfer data from another device, where the data is then transferred to device 830 via USB cable 802 using USB transceivers 822 and 842. This feature may be useful when device 830, which may be a personal computer, is difficult to access, while device 810, e.g. a keyboard, is relatively easy for a user to access. Alternatively, a near field communication channel between near field transceivers 824 and 844 may be utilized as a secondary channel for transferring, for example, control messages related to the communication between USB transceivers 822 and 842. In FIG. 16, a first device 850 includes an interface circuit 860 that includes an infrared USB transceiver 862 combined with a near field transceiver 864. Similarly, a second device 870 includes an interface circuit 880 that also includes an infrared USB transceiver 882 combined with a near field transceiver 884. Similar to the embodiment of FIG. 15, the embodiment of FIG. 16 may provide a method for easier access for near field data transfer for another device utilizing near field transceiver 864 or near field transceiver 864 and 884 may combine to provide a secondary communication channel between devices 850 and 870.

Use of Near-Field Transceivers in Hearing Aids and other products compatible with cell phone or PDA near-field transceivers: As pointed out above, hearing aid devices have a need for a communication means that will fit inside the tiny hearing aid for both uploading parameters and for receiving digital audio with a cell phone. This can be readily supplied by a near-field receiver or transceiver inside of the hearing aid that is compatible with a near-field transceiver in a cell phone. FIG. 7 is a diagram illustrating an example of a near-field communication link between a cell phone device and a hearing aid device.

Even if the cell phone near-field antenna for proximity communication is not next to the ear-piece, another auxiliary near-field transmit antenna, whether capacitive or inductive, can be placed around the ear piece. When the cell phone is put into hearing aid mode, it can send the digitized receive audio directly from the cell phone ear piece transmit antenna to the near field receive antenna of the hearing aid, since the two devices will typically be positioned no more than a few centimeters away from one another. This will allow improved intelligibility of the cell phone signal by allowing the hearing aid to directly process the audio data without distortion or variability in signal level as the headphone is moved around on the ear. The cell phone may send either digital encoded audio output from its own voice decoder or it may send the received data before going to the voice decoder so that the hearing aid may more appropriately recover the compressed voice audio from the far end voice coder.

A hearing aid near-field receiver, especially if it has a capacitive antenna, can be smaller than an IrDA transceiver and be a simpler design that omits AGC, since the ear canal and cell phone are fairly well shielded against near-field noise. Typically, it does not need data rates beyond 115.2 Kbps. Consequently, the hearing aid receiver's current consumption may be below 50 uA and, if only powered up at a low duty cycle, may consume even less, which will extend battery life.

Another application of the near-field receiver in a hearing aid is that it can be used to up-load digital filter and gain coefficients without a connector or contacts. A PDA or cell phone could be used as the upload source and can be used as a user friendly display terminal for programming the hearing aid. For this function, the hearing aid may require a bi-directional near-field transceiver so that the cell phone as a programming terminal can read the parameters in the hearing aid. The presence of a near-field transceiver can give the user more options to control the hearing aid, e.g. selecting a preprogrammed mode of operation (sleep, concert, meeting . . . ).

The same approach may be taken in order to use a PDA and cell phone with a near-field transceiver as a convenient small terminal to program or send data to other terminal-less devices; such as smart light switches. If device is particularly small, then a near field receiver on the device may be less costly than an IrDA receiver. For many smart electronic devices, the terminal aspect of display and keyboard are left off the product in order to reduce cost or because there is no room for these components on the smart device. Since virtually all PDAs have IrDA transceivers, it is logical and desirable that PDAs acquire IrDA/Near-Field transceivers since the near-field transceiver could be used as a user interface to communicate with the smart devices.

Figure 12:
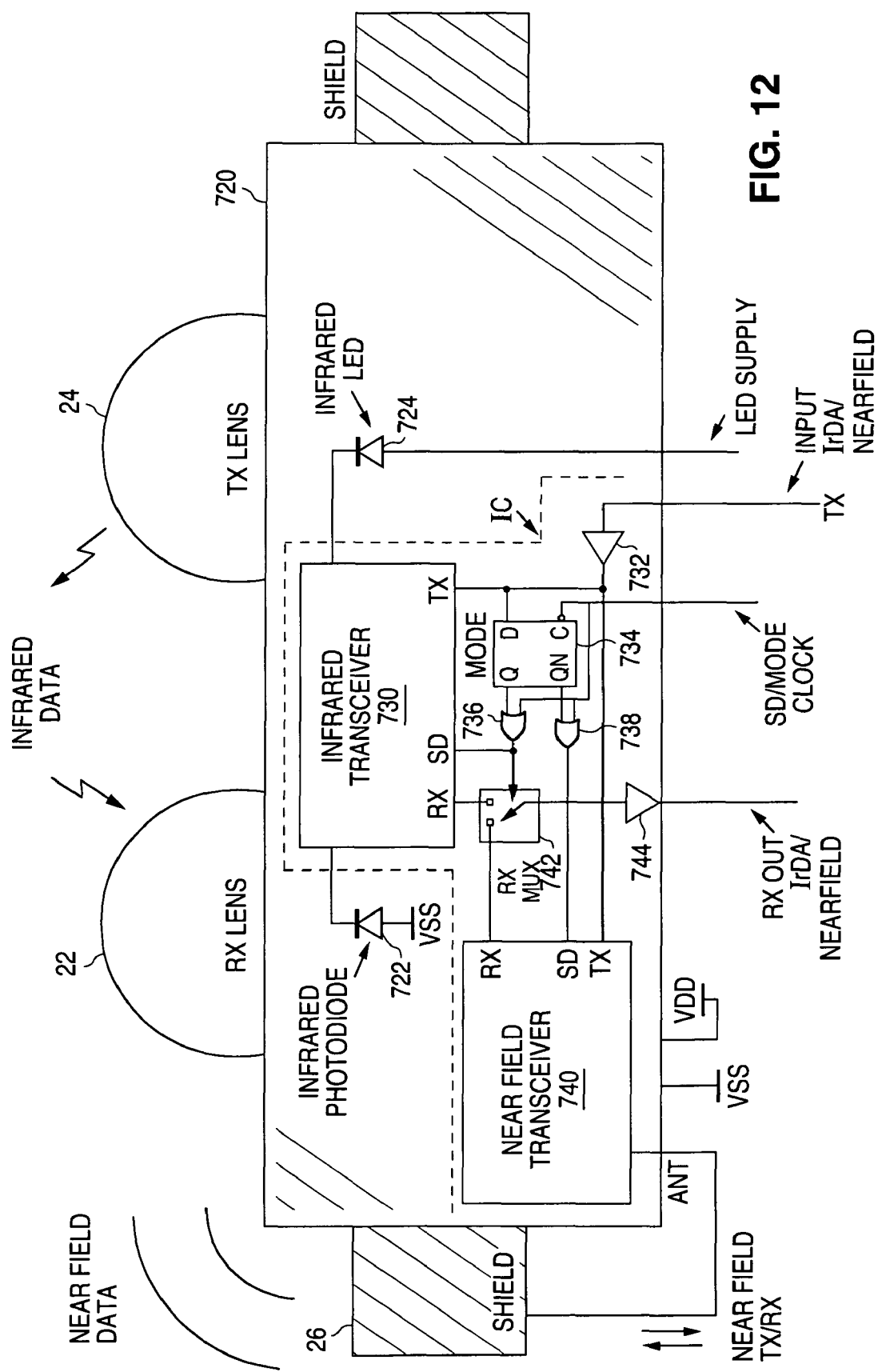
FIG. 12 is a functional block diagram illustrating an embodiment of a transceiver configured to operate in infrared and near-field modes.
Figure 13:
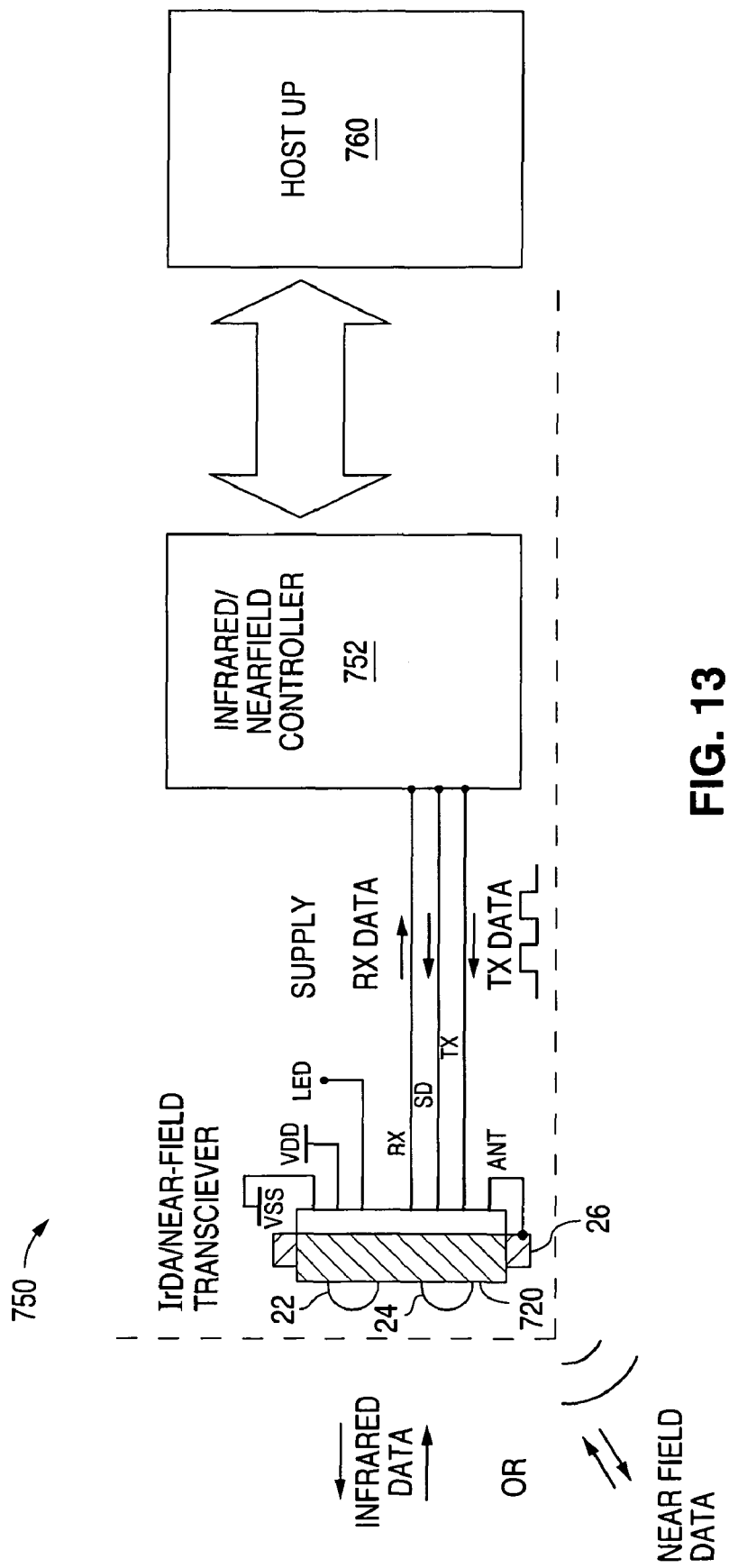
FIG. 13 is a functional block diagram illustrating an example of the transceiver of FIG. 12 operating with a controller the switches the transceiver between infrared and near-field modes and interfaces with a microprocessor.

FIG. 12 is a functional block diagram illustrating an embodiment of a transceiver 720 configured to operate in infrared and near-field modes. Mode control, in this example, is accomplished by setting the TX input and clocking the SD line to latch the mode setting of the TX input to buffer 732 into a flip-flop 734, which controls a multiplexor 742 that switches between an infrared portion of the transceiver 730 and a near-field portion 740. Once the near-field mode is set, data received by the near-field portion 740 of transceiver 720 will be output through buffer 744 to a receiver output pin of the circuit 720. Once the mode is reset, data received by the infrared transceiver 720 will appear on the receiver output pin. FIG. 13 is a functional block diagram illustrating an example of the transceiver of FIG. 12 operating with a controller 752 that switches the transceiver 720 between infrared and near-field modes and interfaces with a microprocessor 760. The controller 752 determines the mode of operation of the transceiver 720 and relays data to and from the microprocessor 760.

Figure 14:
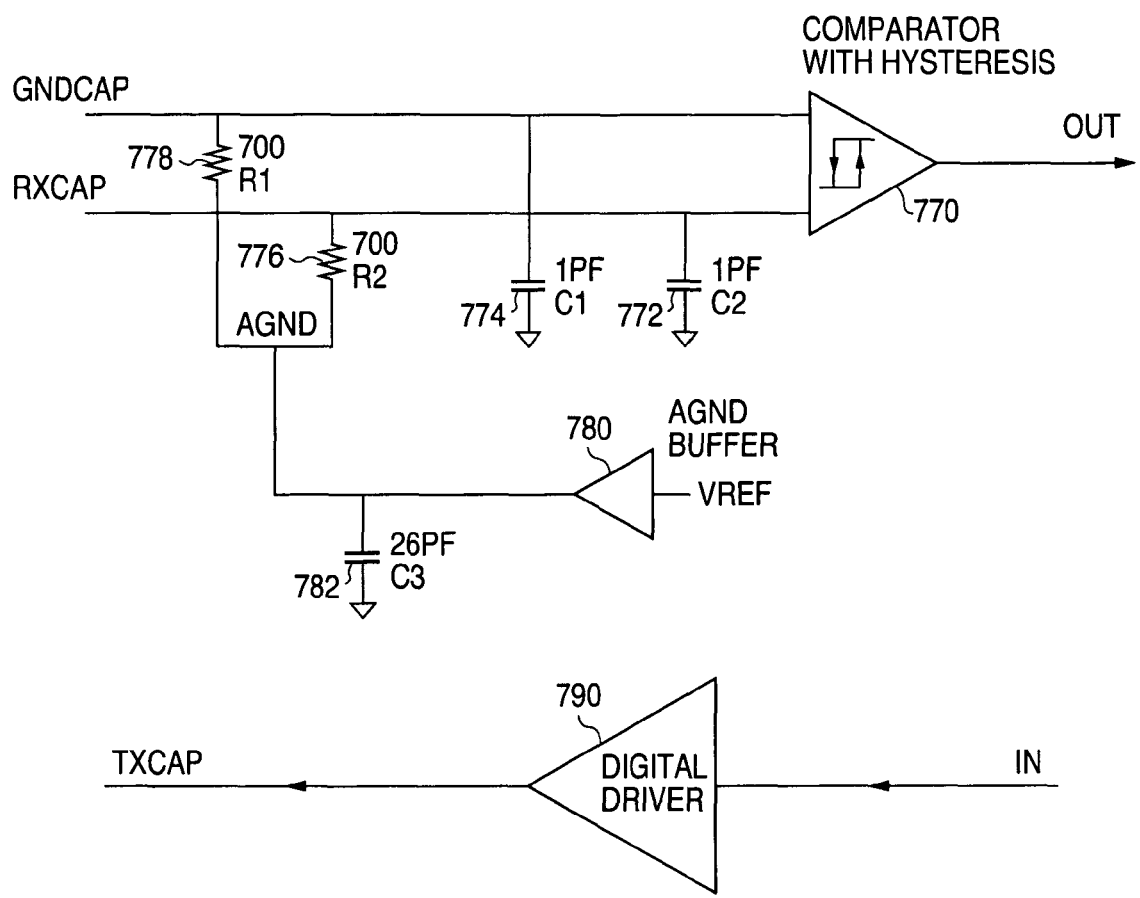
FIG. 14 is a circuit diagram illustrating an example of a capacitive receiver for use in receiving signals in a capacitive near-field transceiver device.

FIG. 14 is a functional block diagram illustrating an example of a capacitive receiver circuit for use in receiving signals in a capacitive near-field transceiver device. A hysteresis comparator 770 compares the signal received from a capacitively coupled receiver input to pin RXCAP to an analog ground level input to pin GNDCAP in order to generate and output a received near-field data signal. FIG. 14 is a functional block diagram illustrating an example of a capacitive transmitter circuit for use in transmitting signals in a capacitive near-field transceiver device. A digital driver 790 outputs a transmit data signal to a capacitive transmit coupling to pin TXCAP in order to send a near-field data signal.

In one embodiment, a half-duplex near-field transceiver is combined with an IrDA module on the same integrated circuit die, where the TX and RX signals are substantially compatible with IrDA module TX and RX signals. This embodiment may be further refined by using the IrDA module shield as an antenna for the near-field transceiver, as illustrated in FIG. 1.

In another embodiment, an IrDA transceiver is combined with a Near-field transceiver having a single ended capacitive near-field antenna. The antenna can be implemented, for example, as an existing metal shield around the IrDA module, a single metal plate in front of the module, or as a conductive trace on a printed circuit board (PCB), which is connected to an interface pin on the transceiver module. FIG. 2 illustrates the use of an inductive auxiliary transmit loop antenna with a combined IrDA and near-field transceiver. In a further embodiment, the receiving antenna for the near-field device is the IrDA shield, but a separate auxiliary antenna is used for transmitting, as shown in FIGS. 2 and 3. For higher proximity security, a smaller transmitting antenna may be used. In addition, the phasing of IrDA shield and TX input may be designed to be the same, so that the TX data input of the transceiver can drive the larger auxiliary TX antenna. In a further embodiment, the connection to the shield is via a contact or small capacitor between the IrDA/near-field transceiver circuit package formed between shield and trace areas on the module.

In one embodiment, an IrDA transceiver is combined with a Near-field transceiver having a single ended inductive near-field antenna (FIG. 2). The IrDA/Near-field inductive near-field antenna can be implemented as an existing metal shield around IrDA module, a conductive loop on the PCB or a conductive wire around the transceiver module or on a packaging case. In a further embodiment, the combined IrDA/Near-Field transceiver uses the IrDA shield as the near field antenna with another shield 124 behind the IrDA shield to reduce local near field noise.

In still another embodiment, a half-duplex near-field transceiver is provided where the transmitting antenna generates both an inductive and capacitive near-field by putting the current limiting resistor at the end of the transmit antenna loop 122 and the receiver is configured to determine which receiving mode is best and utilize the best mode. In a further embodiment, the half duplex baseband near-field transceiver is bridged to a USB or Firewire (IEEE 1394) system.

In yet another embodiment, an infrared transceiver provides a parallel channel for other USB status and control signals. Another embodiment incorporates a half duplex near field transceiver antenna around the edges of USB driven computer peripherals, such as keyboards, display monitors, wireless keyboard and mouse drivers.

One embodiment involves a baseband near field system with AGC and automatic time out that reverts a hysteresis receiver back to idle state after a pre-determined amount of time. Another embodiment provides for controlling the detect bandwidth responsive to the automatic gain control (AGC) level exceeding a threshold, so that the data rate is adjusted for signal level. Another embodiment provides for an adjustable AGC bandwidth threshold.

In another embodiment, a half duplex near field receiver with a capacitive antenna is configured such that the AGC bandwidth threshold is adjustable with a resistor 228, 248 tied to the antenna input, as shown in FIG. 3. In a further embodiment, a half duplex near field receiver is configured such that a detect threshold is adjustable by using a resistor 249 in series with the shutdown (SD) control pin. In another embodiment, a resistor 249 connected to an antenna pin is used to adjust minimum detect threshold. In these embodiments, a resistor is connected to a digital input/output pin so that the I/O pin is multiplexed for use as an antenna or digital signal interface during normal operation and to set an operating parameter of the transceiver circuit, such as during an initialization cycle. During initialization, for example, a voltage is output from the circuit onto the I/O pin and the resulting current flow is measured by the circuit in order to determine the magnitude of the resistance. The operating parameter is then set based on the magnitude of the measured current. Once the parameter is set, the voltage is removed from the I/O pin, which returns to functioning as a digital signal interface or antenna interface. In another embodiment, digital serial shift loading of adjustments to operating parameters is performed.

In another embodiment, a near-field baseband receiver includes an AGC circuit with fast attack that introduces an anti-signal when AGC gain decreases in response to an input signal. The anti-signal is larger than the worst case integrated circuit (IC) mismatch.

In an embodiment, a near-field receiver is combined with an IrDA transceiver that can operate in either baseband or carrier mode.

In an embodiment, a half duplex baseband near-field transceiver is combined with a IEEE 802.11 or Bluetooth transceiver in order to synchronize and securely pass encryption keys, as illustrated in FIGS. 6 and 7.

In an embodiment, a controller for a half duplex near-field inductive baseband transceiver is configured for phase inversion detection by correlating preamble syncs with in phase or out of phase syncs.

In an embodiment, an IrDA/Near-Field device is combined in an electronic device, such as a cell phone, for communication with a compatible baseband Near-Field transceiver in another electronic device, such as a headphone, in order to synchronize communication between wireless transceivers, such as Bluetooth, in both devices. See FIGS. 6 and 7. In a further embodiment, proximity pairing wireless transceivers (Bluetooth, WiFi) are provided with a simple repetitive baseband near-field signal.

Another embodiment provides for using a cell phone near-field transmitting antenna around the cell phone ear piece to send audio digital data from either before voice decoder or after it to be sent directly to a near-field receiver in a hearing aid. A further embodiment provides for sending digital audio to the hearing aid from any device by using a near-field transceiver, such as PDA, cell phone, headphones.

An additional embodiment provides for using a cell phone, PDA or other device equipped with a near-field transceiver to upload control parameters to a hearing aid or to any other terminal less electronic device. A further embodiment provides for control of the operation of a hearing aid or any other portable terminal-less electronic device by means of another near-field device such as cell phone, PDA, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A communication device having optical and near-field communication capability, the device comprising:
   an integrated circuit die;
   an optical transceiver circuit fabricated on the integrated circuit die and configured to transmit and receive optical signals;
   a near field transceiver circuit fabricated on the integrated circuit die and configured to transmit and receive data using near-field electro-magnetic signals; and
   control circuitry configured to selectively enable the optical transceiver circuit and the near field transceiver circuit responsive to an external control signal;
   the communication device further comprising a transmit antenna coupled to the near field transceiver circuit, the transmit antenna comprising at least one of:
      a sub-half-wave plate or wire, with the near field transceiver circuit being configured to transmit capacitive near field signals by driving the sub-half-wave plate or wire with a voltage source, or
      a sub-half-wave loop, with the near field transceiver circuit being configured to transmit inductive near field signals by driving the sub-half-wave loop with a current source, or
      a combination thereof.

2. The communication device of claim 1, the device further comprising an external shield, and where the integrated circuit die includes an antenna interface pin electrically coupled to the external shield, where the near field transceiver circuit is electrically coupled to the antenna interface pin for receiving near field signals using the external shield.

3. The communication device of claim 2, where the integrated circuit die includes a transmit data interface pin electrically coupled to the external shield where a baseband data signal applied to the transmit data interface pin also drives the external shield to transmit near field signals using the external shield.

4. The communication device of claim 2, the device further comprising a transmit antenna, and where the integrated circuit die includes a transmit antenna interface pin electrically coupled to the transmit antenna, where the near field transceiver circuit is electrically coupled to the transmit antenna interface pin for transmitting near field signals using the transmit antenna.

5. The communication device of claim 2, the device further comprising a transmit antenna, and where the integrated circuit die includes a transmit data interface pin electrically coupled to the transmit antenna, where a baseband data signal applied to the transmit data interface pin also drives the transmit antenna.

6. The communication device of claim 2, further comprising a far field transceiver circuit and a pairing controller coupled to the near field transceiver circuit and the, where the pairing controller is configured to send and receive pairing control messages using the near field transceiver circuit in order to establish a far field communication link with another device having another near field transceiver circuit and another pairing controller by exchanging pairing control messages with the another device.

7. The communication device of claim 1, where the optical transceiver circuit further comprises an IrDA specification compliant transceiver.

8. The communication device of claim 1, wherein the near field transceiver circuit is configured to transmit and receive data using at least one of capacitive or inductive near-field signals and without far field radiation.

9. The communication device of claim 1, wherein the near field transceiver circuit is configured to transmit and receive data using non-propagating near field signals.

10. The communication device of claim 9, wherein the near field transceiver circuit is configured to transmit and receive data without using propagating far field signals.

11. The communication device of claim 1, further comprising a transmit antenna coupled to the near field transceiver circuit, the transmit antenna comprising a sub-half-wave plate or wire; and the near field transceiver circuit being configured to transmit capacitive near field signals by driving the sub-half-wave plate or wire with a voltage source.

12. The communication device of claim 1, further comprising a transmit antenna coupled to the near field transceiver circuit, the transmit antenna comprising a sub-half-wave loop; and the near field transceiver circuit being configured to transmit inductive near field signals by driving the sub-half-wave loop with a current source.

13. The communication device of claim 1, wherein the near field transceiver circuit is configured to transmit the near-field electro-magnetic signals to a distance not exceeding 10 centimeters.

14. A communication device having optical and near-field communication capability, the device comprising:
   an integrated circuit die;
   an optical transceiver circuit fabricated on the integrated circuit die and configured to transmit and receive optical signals;
   a near field transceiver circuit fabricated on the integrated circuit die and configured to transmit and receive data using near-field electro-magnetic signals; and control circuitry configured to selectively enable the optical transceiver circuit and the near field transceiver circuit responsive to an external control signal;

where the near field transceiver circuit is further configured to sense a resistance coupled to an interface pin of the integrated circuit die and set an operating parameter of the near field transceiver circuit based on a magnitude of the sensed resistance.

15. A method for providing near field communication capability in a transceiver device, the method comprising the steps of:

fabricating an optical transceiver circuit and a near field transceiver circuit on an integrated circuit die, where the optical transceiver circuit is configured to transmit and receive optical signals, and further wherein the near field transceiver circuit is configured to transmit and receive data using near-field electro-magnetic signals; and providing control circuitry for selectively enabling the optical transceiver circuit and the near field transceiver circuit responsive to a control signal;

the method further comprising at least one of:

electrically coupling a transmit antenna to the integrated circuit die, the transmit antenna comprising a sub-half-wave plate or wire, and transmitting capacitive near field signals by driving the sub-half-wave plate or wire with a voltage source, or electrically coupling a transmit antenna to the integrated circuit die, the transmit antenna comprising a sub-half-wave loop; and transmitting inductive near field signals by driving the sub-half-wave loop with a current source, or a combination thereof.

16. The method of claim 15, the method further comprising the steps of providing an external shield for shielding the integrated circuit die from noise; electrically coupling the external shield to the integrated circuit die; and receiving near field signals using the external shield.

17. The method of claim 16, the method further comprising the steps of: electrically coupling a transmit antenna to the integrated circuit die; and transmitting near field signals using the transmit antenna.

18. The method of claim 16, the method further comprising the steps of: electrically coupling a transmit antenna to the integrated circuit die; and near field transmitting a baseband data signal by directly applying the baseband data signal to the transmit antenna.

19. The method of claim 16, the method further comprising the step of near field transmitting a baseband data signal by directly applying the baseband data signal to the external shield.

20. The method of claim 16, the method further comprising the steps of: providing pairing control for sending and receiving pairing control messages using the near field transceiver circuit; and establishing a far field communication link with another device having another near field transceiver circuit and another pairing controller by exchanging pairing control messages with the another device.

21. The method of claim 16, the method further comprising the steps of: electrically coupling a transmit antenna or external shield to the integrated circuit die; and transmitting near field signals to a distance not exceeding 10 centimeters using the transmit antenna or external shield.

22. The method of claim 15, wherein the near field transceiver circuit is configured to transmit and receive data using at least one of capacitive or inductive near-field signals and without far field radiation.

23. The method of claim 15, wherein the near field transceiver circuit is configured to transmit and receive data using non-propagating near field signals.

24. The method of claim 23, wherein the near field transceiver circuit is configured to transmit and receive data without using propagating far field signals.

25. The method of claim 15, further comprising the steps of: electrically coupling a transmit antenna to the integrated circuit die, the transmit antenna comprising a sub-half-wave plate or wire; and transmitting capacitive near field signals by driving the sub-half-wave plate or wire with a voltage source.

26. The method of claim 15, further comprising the steps of: electrically coupling a transmit antenna to the integrated circuit die, the transmit antenna comprising a sub-half-wave loop; and transmitting inductive near field signals by driving the sub-half-wave loop with a current source.

27. A method for providing near field communication capability in a transceiver device, the method comprising the steps of:

fabricating an optical transceiver circuit and a near field transceiver circuit on an integrated circuit die, where the optical transceiver circuit is configured to transmit and receive optical signals, and further wherein the near field transceiver circuit is configured to transmit and receive data using near-field electro-magnetic signals; and providing control circuitry for selectively enabling the optical transceiver circuit and the near field transceiver circuit responsive to a control signal;

the method further comprising the steps of: sensing a resistance present at an interface of the integrated circuit die; and setting an operating parameter of the near field transceiver circuit based on a magnitude of the sensed resistance.

28. The system for wireless near field communication, the system comprising:

a first integrated circuit device, the first device having formed thereon a first transceiver circuit, a first near field transceiver circuit, and control circuitry for selectively enabling one of the first transceiver circuit and the first near field transceiver circuit responsive to an external control signal; and a first antenna coupled to the first near field transceiver circuit;

a second integrated circuit device, the second device having formed thereon a second near field transceiver circuit, and a second antenna coupled to the second near field transceiver circuit; where the first antenna and the second antenna are capacitively coupled to one another within a distance of about one wavelength in order to exchange non-propagating wireless near field data signals.

29. The system of claim 28, wherein: the first integrated circuit device further includes a pairing controller configured to send messages using the near field transceiver of the first device; and the second integrated circuit device further includes a first transceiver circuit and a pairing controller configured to receive messages using the near field transceiver of the second device, the pairing controller of the second device being configured to receive messages from the pairing controller of the first integrated circuit device in order to establish a communication link between the first transceiver of the first integrated circuit device and the first transceiver of the second integrated circuit device.

30. The system of claim 29, where the near field transceivers of the first and second integrated circuit devices are each configured to communicate with one another in a half duplex manner.

31. The system of claim 29, where the first transceiver of the first integrated circuit device and the first transceiver of the second integrated circuit device each further comprise an optical transceiver.

32. The system of claim 29, where the first transceiver of the first integrated circuit device and the first transceiver of the second integrated circuit device each further comprise a radio frequency transceiver.

33. The system of claim 28, where the near field transceiver of the first integrated circuit device is further configured to transmit a baseband data signal.

34. The system of claim 28, where the first transceiver circuit of each of the first and second integrated circuit devices further comprises a USB transceiver.

35. The system of claim 34, where the near field transceiver circuits of each of the first and second integrated circuit devices are further configured to provide a secondary communication channel for the USB transceivers of the first and second integrated circuit devices.

36. A communication device having optical and near-field communication capability, the device comprising:
- an integrated circuit die;
- an optical transceiver circuit fabricated on the integrated circuit die and configured to transmit and receive optical signals;
- a near field transceiver circuit fabricated on the integrated circuit die and configured to transmit and receive near-field electro-magnetic signals; and
- control circuitry configured to selectively enable the optical transceiver circuit and the near field transceiver circuit responsive to an external control signal;
- where the near field transceiver circuit is further configured to sense a resistance coupled to an interface pin of the integrated circuit die and set an operating parameter of the near field transceiver circuit based on a magnitude of the sensed resistance.

37. A method for providing near field communication capability in a transceiver device, the method comprising the steps of:
- fabricating an optical transceiver circuit and a near field transceiver circuit on an integrated circuit die, where the optical transceiver circuit is configured to transmit and receive optical signals, and further wherein the near field transceiver circuit is configured to transmit and receive near-field electro-magnetic signals;
- providing control circuitry for selectively enabling the optical transceiver circuit and the near field transceiver circuit responsive to a control signal;
- sensing a resistance present at an interface of the integrated circuit die; and
- setting an operating parameter of the near field transceiver circuit based on a magnitude of the sensed resistance.

* * * * *